(12) United States Patent
De Groot et al.

(10) Patent No.: US 6,778,280 B2
(45) Date of Patent: Aug. 17, 2004

(54) INTERFEROMETRY SYSTEM AND METHOD EMPLOYING AN ANGULAR DIFFERENCE IN PROPAGATION BETWEEN ORTHOGONALLY POLARIZED INPUT BEAM COMPONENTS

(75) Inventors: Peter J. De Groot, Middletown, CT (US); Henry A. Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 10/174,149

(22) Filed: Jun. 17, 2002

(65) Prior Publication Data

US 2003/0007156 A1 Jan. 9, 2003

Related U.S. Application Data

(60) Provisional application No. 60/322,950, filed on Sep. 17, 2001, and provisional application No. 60/303,299, filed on Jul. 6, 2001.

(51) Int. Cl.[7] ............................................. G01B 9/02
(52) U.S. Cl. ..................................... 356/493; 356/487
(58) Field of Search ................................ 356/485, 486, 356/487, 492, 493, 500

(56) References Cited

U.S. PATENT DOCUMENTS

| | | | |
|---|---|---|---|
| 4,684,828 A | 8/1987 | Sommargren | |
| 4,687,958 A | 8/1987 | Sommargren | |
| 5,724,136 A | 3/1998 | Zanoni | |
| 5,862,164 A | 1/1999 | Hill | |
| 5,917,844 A | 6/1999 | Hill | |
| 5,970,077 A | 10/1999 | Hill | |
| 6,121,058 A | 9/2000 | Shell et al. | |
| 6,157,660 A | 12/2000 | Hill | |
| 6,163,379 A | 12/2000 | de Groot | |
| 6,181,420 B1 | 1/2001 | Badami et al. | |
| 6,198,574 B1 | 3/2001 | Hill | |
| 6,201,609 B1 | 3/2001 | Hill et al. | |
| 6,236,507 B1 | 5/2001 | Hill et al. | |
| 6,271,923 B1 | 8/2001 | Hill | ............................ 356/487 |
| 6,313,918 B1 * | 11/2001 | Hill et al. | .................... 356/498 |
| 6,384,899 B1 | 5/2002 | Den Boef | |

OTHER PUBLICATIONS

V.I. Teleshevsky, "The Methods of Heterodyne Laser Interferometry for Nano and Micro Dimensional Measurements," Progress in Precision Engineering and Nanotechnology, vol. 1, pp. 71–74, 1997.

Chien–Ming Wu et al., "Analytical modeling of the periodic nonlinearity in heterodyne interferometry," Applied Optics, vol. 37, No. 28, pp. 6696–6700, Oct. 1, 1998.

* cited by examiner

Primary Examiner—Samuel A. Turner
Assistant Examiner—Michael A. Lyons
(74) Attorney, Agent, or Firm—Fish & Richardson P.C.

(57) ABSTRACT

The invention features an interferometry system that uses a small angular difference in the propagation directions of orthogonally polarized components of an input beam to an interferometer. The orthogonally polarized components define reference and measurement beams for the interferometer. The angular difference allows one to distinguish between the reference and measurement beam components of the input beam and facilitates the suppression of at least some of the cyclic errors caused by interferometer imperfections.

48 Claims, 15 Drawing Sheets

INTERFEROMETRY SYSTEM AND METHOD EMPLOYING AN ANGULAR DIFFERENCE IN PROPAGATION BETWEEN ORTHOGONALLY POLARIZED INPUT BEAM COMPONENTS

CROSS-REFERENCE TO RELATED APPLICATIONS

This application claims priority to U.S. application Ser. No. 60/322,950, filed on Sep. 17, 2001 and U.S. application Ser. No. 60/303,299, filed on Jul. 6, 2001, both of which are incorporated herein by reference.

BACKGROUND

This invention relates to interferometers, e.g., displacement measuring and dispersion interferometers that measure angular and linear displacements of a measurement object such as a mask stage or a wafer stage in a lithography scanner or stepper system, and also interferometers that monitor wavelength and determine intrinsic properties of gases.

Displacement measuring interferometers monitor changes in the position of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, by acousto-optical modulation, or internal to the laser using birefringent elements or the like. The orthogonal polarizations allow a polarizing beam-splitter to direct the measurement and reference beams to the measurement and reference objects, respectively, and combine the reflected measurement and reference beams to form overlapping exit measurement and reference beams. The overlapping exit beams form an output beam that subsequently passes through a polarizer. The polarizer mixes polarizations of the exit measurement and reference beams to form a mixed beam. Components of the exit measurement and reference beams in the mixed beam interfere with one another so that the intensity of the mixed beam varies with the relative phase of the exit measurement and reference beams. A detector measures the time-dependent intensity of the mixed beam and generates an electrical interference signal proportional to that intensity. Because the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnp/\lambda$, where v is the relative speed of the measurement and reference objects, $\lambda$ is the wavelength of the measurement and reference beams, n is the refractive index of the medium through which the light beams travel, e.g., air or vacuum, and p is the number of passes to the reference and measurement objects. Changes in the relative position of the measurement object correspond to changes in the phase of the measured interference signal, with a $2\pi$ phase change substantially equal to a distance change in L of $\lambda/(np)$, where L is a round-trip distance change, e.g., the change in distance to and from a stage that includes the measurement object.

Unfortunately, this equality is not always exact. Many interferometers include non-linearities such as what are known as "cyclic errors." The cyclic errors can be expressed as contributions to the phase and/or the intensity of the measured interference signal and have a sinusoidal dependence on phase changes associated with changes in optical path length pnL and/or on phase changes associated with other parameters. For example, there is first harmonic cyclic error in phase that has a sinusoidal dependence on $(2\pi pnL)/\lambda$ and there is second harmonic cyclic error in phase that has a sinusoidal dependence on $2(2\pi pnL)/\lambda$. Higher harmonic and fractional cyclic errors may also be present.

Cyclic errors can be produced by "beam mixing," in which a portion of an input beam that nominally forms the reference beam propagates along the measurement path and/or a portion of an input beam that nominally forms the measurement beam propagates along the reference path. Such beam mixing can be caused by misalignment of interferometer with respect to polarization states of input beam, birefringence in the optical components of the interferometer, and other imperfections in the interferometer components, e.g., imperfections in a polarizing beam-splitter used to direct orthogonally polarized input beams along respective reference and measurement paths. Because of beam mixing and the resulting cyclic errors, there is not a strictly linear relation between changes in the phase of the measured interference signal and the relative optical path length pnL between the reference and measurement paths. If not compensated, cyclic errors caused by beam mixing can limit the accuracy of distance changes measured by an interferometer. Cyclic errors can also be produced by imperfections in transmissive surfaces that produce undesired multiple reflections within the interferometer and imperfections in components such as retroreflectors and/or phase retardation plates that produce undesired ellipticities and undesired rotations of planes of polarization in beams in the interferometer. For a general reference on the theoretical causes of cyclic errors, see, for example, C. W. Wu and R. D. Deslattes, "Analytical modelling of the periodic nonlinearity in heterodyne interferometry," *Applied Optics*, 37, 6696–6700, 1998.

In dispersion measuring applications, optical path length measurements are made at multiple wavelengths, e.g., 532 nm and 1064 nm, and are used to measure dispersion of a gas in the measurement path of the distance measuring interferometer. The dispersion measurement can be used to convert the optical path length measured by a distance measuring interferometer into a physical length. Such a conversion can be important since changes in the measured optical path length can be caused by gas turbulence and/or by a change in the average density of the gas in the measurement arm even though the physical distance to the measurement object is unchanged. In addition to the extrinsic dispersion measurement, the conversion of the optical path length to a physical length requires knowledge of an intrinsic value of the gas. The factor $\Gamma$ is a suitable intrinsic value and is the reciprocal dispersive power of the gas for the wavelengths used in the dispersion interferometry. The factor $\Gamma$ can be measured separately or based on literature values. Cyclic errors in the interferometer also contribute to dispersion measurements and measurements of the factor $\Gamma$. In addition, cyclic errors can degrade interferometric measurements used to measure and/or monitor the wavelength of a beam.

SUMMARY

The invention features an interferometry system that uses a small angular difference in the propagation directions of orthogonally polarized components of an input beam to an interferometer. The orthogonally polarized components define reference and measurement beams for the interferometer. The angular difference allows one to distinguish between the reference and measurement beam components of the input beam and facilitates the suppression of at least some of the cyclic errors caused by interferometer imperfections.

For example, birefringence in the interferometer optics, an imperfect polarizing beam-splitting surface, and/or polarization rotation by reflective surfaces in the interferometer can cause a spurious portion of the reference beam to propagate along some or all of the measurement path. Similarly, they can cause a spurious portion of the measurement beam to propagate along some or all, of the reference path. In the absence of the angular difference, at least some of the spurious beams contribute to the interferometric output signal produced after the interferometer recombines the reference and measurement beams. Such contributions complicate the interferometric signal and effectively degrade the accuracy of the measurement.

The angular difference, however, encodes the desired portion of each of the reference and measurement beams with a propagation vector that differs from its spurious portion. For example, when imperfections in the interferometer cause a spurious portion of the reference beam to propagate along the measurement beam path, that spurious portion has a propagation vector that differs from the desired portion of the measurement beam because it was originally encoded with the reference beam propagation vector.

A compensating optic (or a set of compensating optics) in the interferometry system is then used to redirect one or both of the desired portions of the reference and measurement beams to compensate for the angular difference in propagation prior to the detection of an optical interference signal. Even though a spurious beam component may overlap with the desired component at the compensating optic and be redirected by it, the spurious component will not be redirected for optimal interference at the photo-detector because it is not encoded with the correct, initial propagation vector. Thus, at the photo-detector, the desired beam components are made parallel to one another, whereas the spurious beam diverge from the desired components and each other. Because of such divergence, any optical interference signal produced by the spurious beam averages away when integrated over the spatial extent of the detector. Alternatively, spatial filtering can be used to remove the spurious beams. In any case, the cyclic error contributions to the detected interference signal are reduced.

A polarization optic may be used to produce the angular difference between orthogonally polarized components of an input beam. The polarization optic may be, for example, a birefringent prism, either alone or in combination with one or more additional optics such as a non-birefringent wedge, a Wollaston prism, or a composite optic employing a polarizing beam splitting surface such as a composite optic forming a misaligned Mach-Zehnder interferometer. The function of the polarization optic is to produce an angular difference in propagation between orthogonally polarized components of an input beam. The magnitude of the angular difference may be, for example, on the order of about 1 mrad. In preferred embodiment, the angular difference in propagation produced by the polarization optic is small enough that the orthogonally polarized components continue to overlap along nominally common portions of the reference and measurement paths, thereby permitting compact interferometer constructions. The polarization optic may be integrally attached to the interferometer or incorporated within the interferometer. Alternatively, it can be spaced from the interferometer. For example, the polarization optic may part of a laser source used to generate the input beam and/or part of an electro-optic system used to generate a heterodyne frequency shift between the orthogonally polarized components.

The compensating optic may be positioned to receive the reference and measurement beam components after the interferometer recombines them. In such cases, for example, the compensating optic may be a polarization optic complementary to the polarization optic initially producing the angular difference. Indeed, in some embodiments, the first polarization optic and the compensating, polarization optic may correspond to different regions of the same component. Alternatively, the compensating optic may be part of, or positioned within, the interferometer. For example, an interferometer optic defining one of the measurement or reference paths (e.g., a mirror) may be oriented to compensate for the angular difference, or an optic such as a wedge may be introduced into one of the measurement or reference paths and oriented to compensate for the angular difference. Furthermore, multiple, compensating optics may be used, which in combination compensate for the angular difference. Typically, the polarization optic and the compensating optic (s) correct cyclic errors associated with interferometer imperfections located between them.

In general, in one aspect, the invention features an interferometry system including an interferometer and at least one compensation optic. The interferometer is configured to receive an input beam comprising orthogonally polarized components having an angular difference in propagation direction. During operation the interferometer directs at least a portion of one of the orthogonally polarized components along a reference path to define a reference beam and at least a portion of the other of the orthogonally polarized components along a measurement path to define a measurement beam. It then recombines the reference and measurement beams to define an output beam. The at least one compensation optic is positioned and oriented to cause the reference and measurement beam components of the output beam to be substantially co-parallel. The at least one compensation optic may be formed by one or more optics. Any of such compensation optics may be part of, located within, or positioned outside of the interferometer.

In general, in another aspect, the invention features an interferometry method. The method includes the following steps: i) providing an input beam comprising orthogonally polarized components having an angular difference in propagation direction; ii) directing at least a portion of one of the orthogonally polarized components along a reference path to define a reference beam; iii) directing at least a portion of the other of the orthogonally polarized components along a measurement path to define a measurement beam; iv) combining the reference and measurement beams to form an output beam propagating along an output path; and v) causing the reference and measurement beam components of the output beam to be substantially co-parallel.

Embodiments of the invention may include any of the following advantages.

The contribution of cyclic errors to the interferometric detection signal can be reduced, thereby increasing the accuracy of the interferometric measurement. In particular, cyclic error contributions caused by birefringence in the interferometer glass, polarization rotation from a corner cube retroreflector or stage mirror, a finite extinction ratio of a polarizing beam-splitter interface, and/or ghost reflections from the surfaces and interfaces of the interferometer (e.g., wave plates) are reduced. This reduction can be especially useful in multi-axes interferometers where one input beam is used to generate multiple sets of reference and measurement beams. This is because such interferometers tend to include large path lengths in glass, whose cumulative birefringence can cause sizable cyclic errors in the interferometric detection signal if not compensated. The systems and methods described herein, however, can suppress such cyclic errors.

Notably, the cyclic errors can be reduced without completely isolating the measurement beam from the reference beam, i.e., with spatially separating the reference beam component from the measurement beam component throughout their propagation. To the contrary, the angular difference may be small enough that the orthogonally polarized components continue to overlap along nominally common portions of the reference and measurement paths. As a result, the interferometer can be made more compactly. Moreover, because the beams see common regions of the interferometer glass, the system is less sensitive to temperature gradients and non-uniformities that would otherwise affect spatially separated beams differently.

Furthermore, the interferometry systems and methods described herein can be used to provide accurate metrology and positioning measurements in microlithography and beam-writing systems.

Other features, objects, and advantages of the invention will be apparent from the following detailed description and drawings, and from the claims.

DESCRIPTION OF DRAWINGS

The invention will now be further described merely by way of example with reference to the accompanying drawings in which.

Like reference symbols in the various drawings indicate like elements.

DESCRIPTION OF PROFFERED EMBODIMENTS

The invention features an interferometry system that uses a small angular difference in the propagation directions of orthogonally polarized components of an input beam to an interferometer. The angular difference allows one to distinguish desired components of the beam from spurious components caused by, for example, propagation through a moderately birefringement system.

Figure 10:
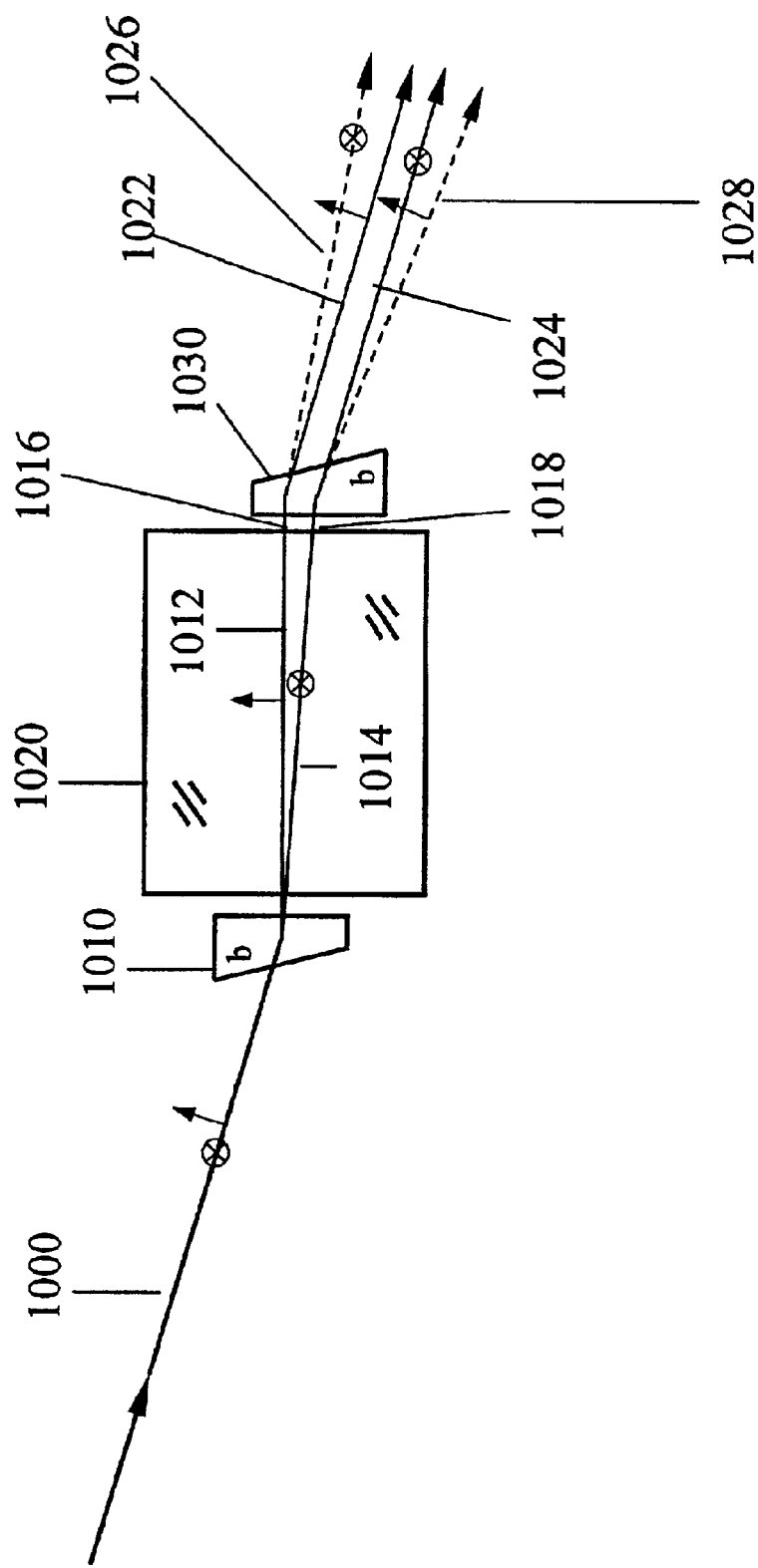
FIG. 10 is a schematic diagram of showing how an angular difference in the propagation directions of two orthogonally polarized components of a beam can be used to provide polarization isolation.

By way of example only, the principle is illustrated in FIG. 10. An input beam 1000 including collinear, orthogonally polarized components passes through a birefringent wedge 1010. Wedge 1010 has an optic axis alignment and an orientation selected to introduce a small (e.g., about 1 mrad), angular difference in the propagation directions of the orthogonally polarized components (denoted by reference numerals 1012 and 1014). As indicated in FIG. 10, component 1012 is linearly polarized in the plane of FIG. 10, whereas component 1014 is linearly polarized in a plane orthogonal to that of FIG. 10. Wedge 1010 functions to "encode" each polarization with a particular propagation direction. Components 1012 and 1014 then propagate into medium 1020 having some birefringence. The moderate birefringence causes components 1012 and 1014 to develop an elliptical polarization and emerge as beams 1016 and 1018. Because of the birefringence, the beams are no longer orthogonal, nor are they isolated from each other by polarization. However, just as birefringent wedge 1010 encoded the initial polarization components with a particular propagation direction, a second complementary birefringent wedge 1030 can be used to "decode" the beams after they have passed through medium 1020. In particular, wedge 1030 has an optic axis alignment and an orientation selected to cause those polarization components of beams 1016 and 1018 that correspond to the polarizations of components 1012 and 1014, respectively, to emerge from wedge 1030 as co-parallel, orthogonally polarized, main beams 1022 and 1024. The remaining polarization components beams 1016 and 1018 emerge as spurious beams 1026 and 1028 that diverge from each other and from the main beams. Accordingly, the pair of birefringent wedges allows one to maintain the purity of the orthogonally polarized components of the input beam in the co-parallel main beams.

Figure 1:
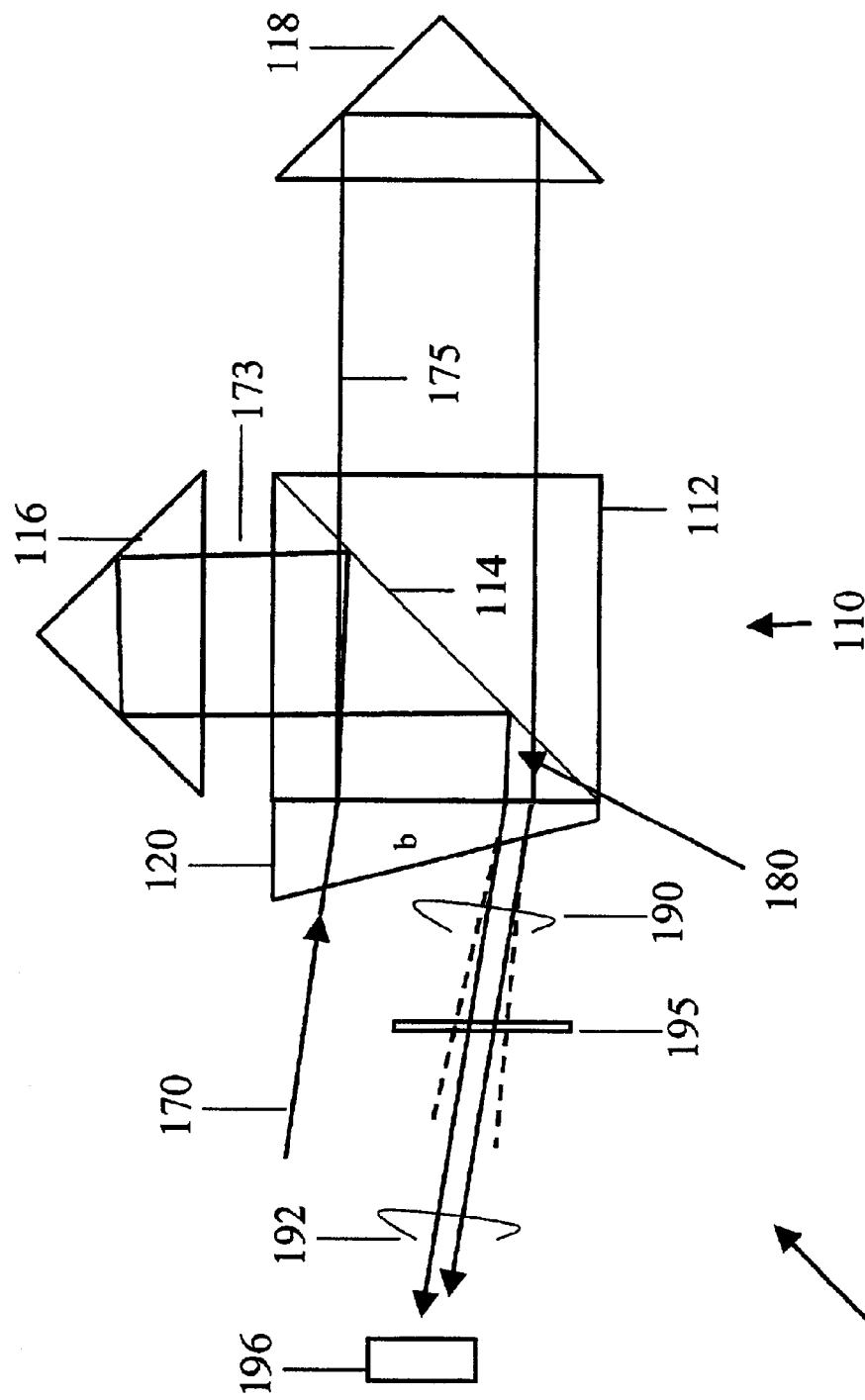
FIG. 1 is a schematic diagram of an embodiment of an interferometry system 100 that suppresses non-linearities caused by properties of the system. The interferometer 110 in this embodiment is a Michelson interferometer and the polarization optic and the compensating optic are formed by a common birefringent prism 120, which is attached to the interferometer and positioned to receive the input beam to the interferometer and the overlapping reference and measurement beams exiting the interferometer.

FIG. 1 shows an interferometry system 100 that suppresses non-linearities such as those caused by beam mixing. System 100 includes a Michelson interferometer 110 having a polarizing beam-splitting cube 112, a reference retroreflector 116, and a measurement retroreflector 118. Beam splitting cube 112 includes a polarizing beam splitting interface 114. Measurement retroreflector 118 is typically connected to a measurement stage (not shown) that moves relative to the beam splitting cube. The purpose of interferometry system 100 is to measure changes in the distance between the beam splitting cube and the measurement stage.

During operation, interferometer 110 receives an input beam 170 having orthogonally polarized components defining reference and measurement beam components. The reference beam component is linearly polarized out of the plane of the figure, and the measurement beam component is linearly polarized in the plane of the figure. The orthogonally polarized components further include a heterodyne frequency shift between them. Prior to entering interferometer 110, input beam 170 intersects birefringent prism 120, e.g., a uniaxial crystal such as quartz. The optical axis of prism 120 is oriented such that the reference and measurement beam components 172 and 174, respectively, of input beam 170 emerge with a small difference $\Delta_2$ in their directions of propagation (see FIG. 2) with the respective states of polarization preserved.

Referring again to FIG. 1, following prism 120 and absent any imperfections in the interferometer, the reference and measurement beam components are spatially separated to define reference beam 173 and measurement beam 175, respectively, and directed along respective reference and measurement paths by polarizing beam-splitter interface 114. Reference beam 173 is redirected back to interface 114 by corner-cube reference retroreflector 116, and measurement beam 175 is redirected back to interface 114 by corner-cube measurement retroreflector 118. The polarizing beam-splitter interface then recombines the reference and measurement beams to form output beam 180, which then intersects birefringent prism 120. Prism 120 compensates for the angular difference $\Delta_2$ between the reference and measurement beam components of the output beam so that those beam components propagate parallel to one another as compensated output beam 190. Furthermore, if desired, the lateral position of one or both of the reference and measurement retroreflectors can be adjusted to optimized the overlap of the reference and measurement beam components of the compensated output beam, so that together with angular compensation by prism 120, the reference and measurement beam components of the compensated output beam can be made collinear. The direction of the measurement beam is aligned parallel to the direction of translation of the measurement retroreflector so that during a subsequent translation of the retroreflector, there will be no lateral shear of the measurement beam introduced.

Referring again to FIG. 2, in addition to the reference and measurement beam components of the output beam described in the previous paragraph (hereinafter referred to as the desired reference and measurement beam components 181 and 182), output beam 180 may include spurious beam components. For example, birefringence in beam-splitting cube 112 can cause a spurious portion of reference beam component 172 to propagate along the measurement path as part of measurement beam 175 and a spurious portion of measurement beam component 174 to propagate along the reference path as part of reference beam 172. These spurious portions emerge as spurious reference and measurement beam components 183 and 184 in output beam 180. Prior to prism 120, however, desired reference beam portion 181 and spurious reference beam portion 183 propagate parallel to one another but have orthogonal polarizations. Similarly, desired measurement beam portion 182 and spurious measurement beam portion 184 propagate parallel to one another but orthogonal polarizations. As result, birefringent prism 120 causes desired portions 181 and 182 to emerge parallel to one another in compensated output beam 190, whereas spurious portions 183 and 184 (dotted lines) are made non-parallel with the compensated output beam and each other. As described in the subsequent paragraph, the non-parallelism of the spurious beams suppresses their contribution to the interferometric measurement. We note that in addition to birefringence in beam-splitter cube 112, such spurious portions can also be produced by the combination of polarizing beam-splitter interface 114 being imperfect and polarization rotation by either of corner-cube retroreflectors 116 and 118, among other types and/or combinations of imperfections.

Referring again to FIG. 1, a polarizer 195 is positioned to mix the orthogonal polarizations of the desired portions of compensated output beam 190 to produce signal beam 192, whose time-varying intensity is monitored by photo-detector 196. The intensity signal includes a heterodyne interference signal at the frequency shift between the reference and measurement beam components of input beam 170. The interference signal is indicative of changes in the path length difference between the reference and measurement paths, e.g., changes in the relative position of measurement retroreflector 118. Although the spurious beam components may also propagate through polarizer 195 and onto photo-detector 196, any optical interference signal produced by them averages away when integrated over the spatial extent of the detector because they diverge from the compensated output beam and from each other. If desired, the spurious beams may also be removed by spatial filtering (not shown in FIG. 1). In additional embodiments, the output beam may be coupled to the detector through an optical fiber (e.g., a fiber-optic pick-up).

In other embodiments of the inventive interferometry system, the interferometer may be different from the Michelson interferometer 110 shown in FIG. 1, for example, the interferometer may be a differential plane mirror interferometer, a double-pass interferometer, a dispersion interferometer using multiple wavelengths (e.g., harmonics such as 1064 nm and 532 nm) or an interferometer with a dynamic beam steering element. The interferometer may be designed to monitor, for example, changes in optical path length, changes in physical path length, changes in refractive index, changes in wavelength of a beam, changes in direction of propagation of a beam, or changes in intrinsic gas properties along a path length. Generally, the interferometer directs a reference beam along a reference path (which may contact a reference object) and a measurement beam along a measurement path contacting a measurement object (e.g., a lithography stage), and then combines the reference and measurement beams to form an overlapping pair of exit beams. In dispersion interferometry applications, there are overlapping pairs of exit beams for each of multiple wavelengths. The interference between the overlapping pair of exit beams contains information about the relative difference in optical path length between the reference and measurement paths. In some embodiments, the reference path is fixed and therefore changes in the optical path length difference correspond to changes in the optical path length of the measurement path. In other embodiments, however, the optical path length of both the reference and measurement paths can be changing. For example, the reference path can contact a reference object (e.g., a column reference) that may move relative to the interferometer. In this latter case, the changes in the optical path length difference correspond to changes in the position of the measurement object relative to the reference object.

Furthermore, in some embodiments, the interferometer may be a multi-axis interferometer, which generates multiple sets of reference and measurement beams to provide corresponding measurements along multiple axes. For example, one such multi-axes interferometer is disclosed in commonly owned, co-pending U.S. Provisional Application entitled "High Performance Multi-Axis Interferometer" filed Jul. 6, 2001 by Henry Hill et al., the contents of which are incorporated herein by reference. In such embodiments, the angular difference imparted by the polarization optic may precede the splitting of the input beam into secondary input beams, each of which is later separated into corresponding reference and measurement beams.

Figure 9A:
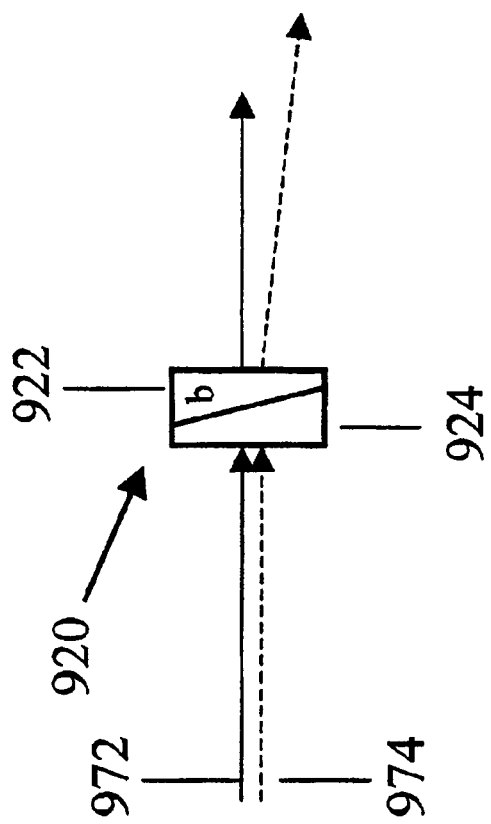
FIG. 9a is another embodiment for the polarization optic 122 in the embodiment of FIGS. 1 and 2.

Also, in embodiments of the invention different from that shown in FIG. 1, the polarization optic may be different from birefringent prism 120. For example, referring to FIG. 9a, the polarization optic may be composite optic 920 formed by the combination of a birefringent wedge 922 and an isotropic wedge 924. The wedge materials and orientations can be selected so that a beam 972 having a selected linear polarization (solid line) transmits through the composite optic without any angular deflection, whereas a beam 974 having the orthogonal linear polarization (dotted line) is angularly deflected by the composite optic. Thus, for example, composite optic 920 may replace birefringent prism 120 in FIG. 1 so that input beam 170 and compensated output beam 190 may enter into, and emerge from, respectively, interferometer 110 along axes parallel to the measurement beam path to measurement retroreflector 190. Such symmetry may simplify alignment of the interferometry system.

Figure 9B:
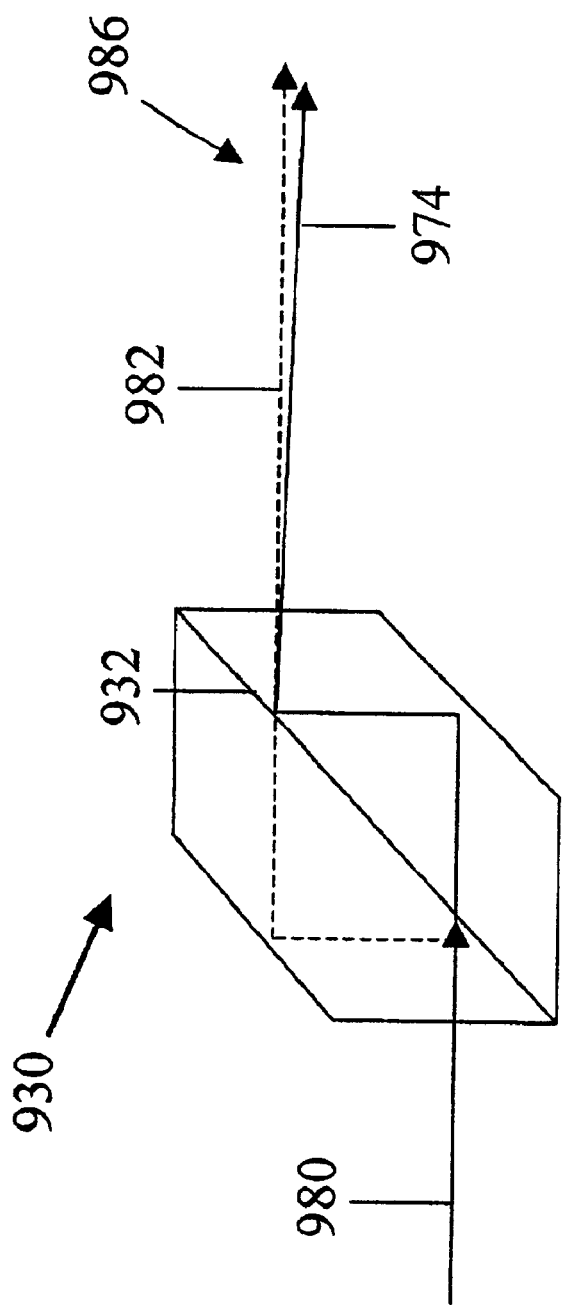
FIG. 9b is yet another embodiments for the polarization optic 122 in the embodiment of FIGS. 1 and 2.

Another example of a polarization optic is shown in FIG. 9b in which a composite optic 930 defines a polarizing beam-splitting surface 932 that separates and then recombines, with a slight misalignment, orthogonal, linearly polarized components 982 and 984 of an input beam 980, to produce an output beam 986 having a small angular difference between the orthogonal, linearly polarized components. Composite optic 930 is an example of a misaligned Mach-Zehnder interferometer. In further embodiments, the polarization optic may be a Wollaston prism, or the like. Any of such polarization optics may be implemented in the subsequently described embodiments. In general, the polarization optic is any optic, or set of optic, which introduces a angular difference between orthogonally polarized components of an input beam, typically, linearly, orthogonally polarized components. In many embodiments, the angular difference is generally small enough that the transmitted components remain overlapping following propagation through the interferometer.

Figure 2:
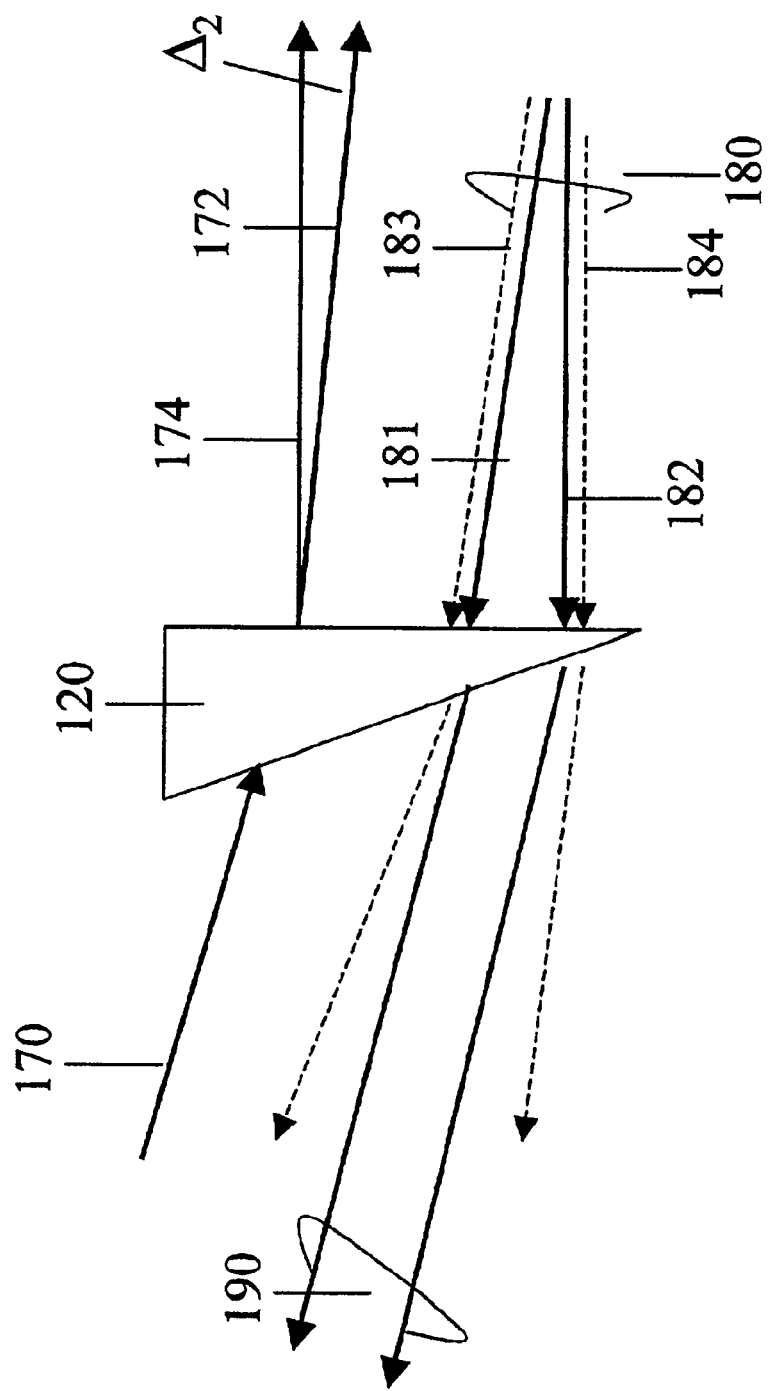
FIG. 2 is a schematic diagram of birefringent prism 120 in the embodiment of FIG. 1 and its effect on the respective beam components.

Furthermore, although the embodiment shown in FIGS. 1 and 2 having birefringement prism 120 performing the function of both a polarization optic positioned to introduce the angular difference between orthogonally polarized components of the input beam and a compensating optic positioned to compensate for the angular difference between the desired portions of the reference and measurement beams, in other embodiments, these functions can be performed by separate optics. For example, birefringent prism 120 can be replaced by two smaller birefringent prisms, either of which may, or may not be integrally attached to interferometer 110. One such embodiment is shown in FIG. 3 for the case of a high stability plane mirror interferometer.

Figure 3:
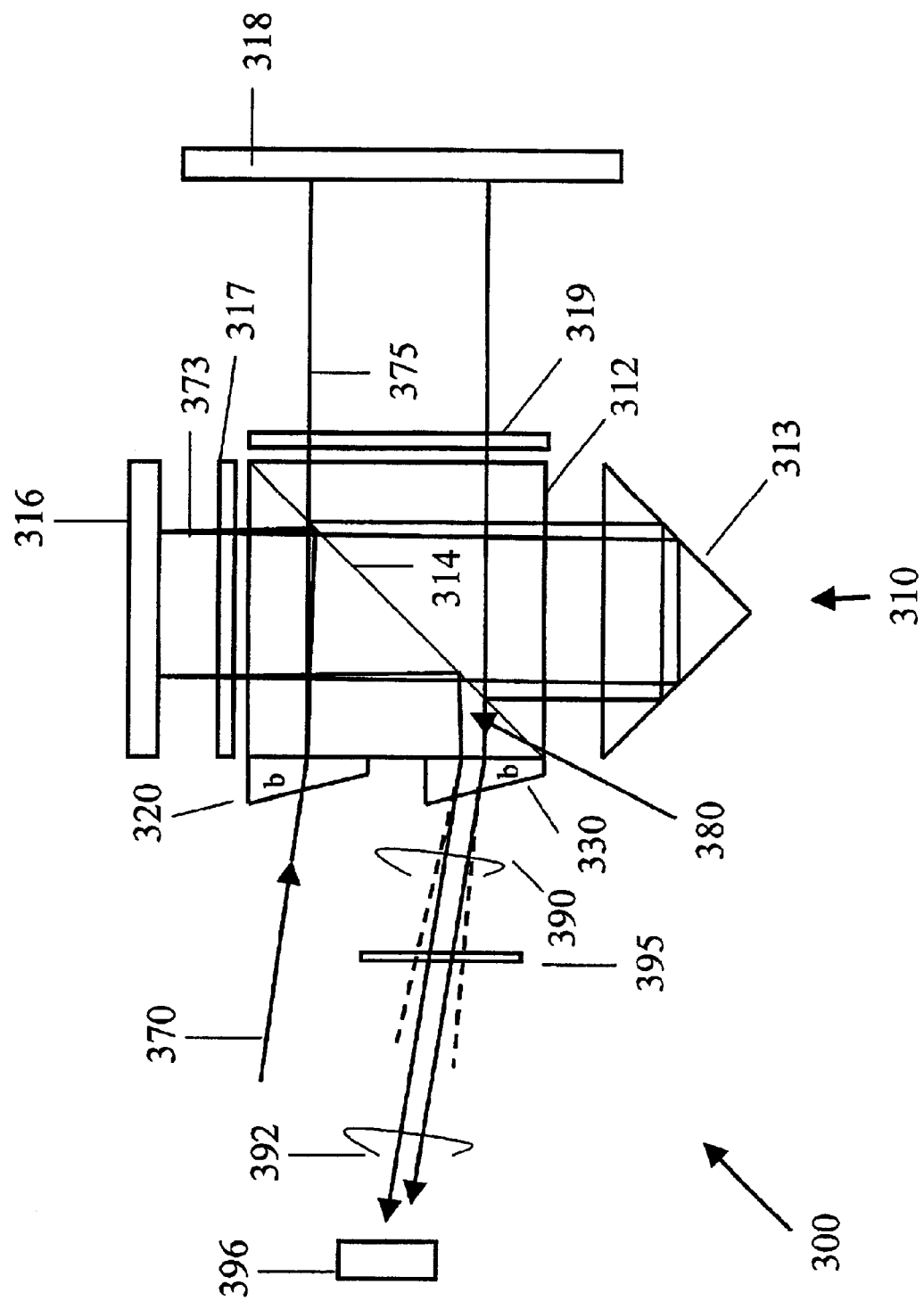
FIG. 3 is a schematic diagram of another embodiment of an interferometry system 300 that suppresses non-linearities caused by properties of the system. The interferometer 310 in this embodiment is a high-stability plane mirror interferometer (HSPMI). The polarization optic is a birefringent prism 320 positioned to receive the input beam. The compensating optic is a separate, similar birefringent prism 330 positioned to receive the reference and measurement beams exiting the interferometer and compensate for the angular difference imparted by prism 320 to the desired portions of the reference and measurement beams.

Referring to FIG. 3, an interferometry system 300 that suppresses non-linearities such as those caused by beam mixing includes a high-stability plane mirror interferometer (HSPMI) 310 having a polarizing beam-splitting cube 312, a reference mirror 316, a reference quarter wave plate 317, a measurement mirror 318, a measurement quarter wave plate 319, and a corner-cube retroreflector 313. Beam splitting cube 312 includes a polarizing beam splitting intreface 314. Measurement mirror 318 is typically connected to a measurement stage (not shown) that moves relative to the beam-splitting cube.

During operation, interferometer 310 receives an input beam 370 having orthogonally polarized components defining reference and measurement beam components. The reference beam component is linearly polarized out of the plane of the figure, and the measurement beam component is linearly polarized in the plane of the figure. The orthogonally polarized components further include a heterodyne frequency shift between them. Prior to entering interferometer 310, input beam 370 intersects birefringent prism 320, e.g., a uniaxial crystal such as quartz. The optical axis of prism 320 is oriented such that the reference and measurement beam components of input beam 370 emerge with a small difference in their directions of propagation. In other words, with respect to the input beam prism 320 is identical to birefringent prism 120 in the embodiment of FIGS. 1 and 2. Unlike prism 120, however, prism 320 is small enough to not contact the exit beams from interferometer 310.

Following prism 320 and absent any imperfections in the interferometer, the reference and measurement beam components are spatially separated to define reference beam 373 and measurement beam 375, respectively, and directed along respective reference and measurement paths by polarizing beam-splitter interface 314. Reference beam 373, which is initially reflected by interface 314, passes through quarter wave plate 317 and onto reference mirror 316, which reflects it back through quarter wave plate 317 to interface 314. Because of the double pass through quarter wave plate 317, the reference beam is then transmitted through interface 314 to retroreflector 313, which laterally translates the beam and reflects it back through interface 314 for a second pass to reference mirror 316. During this second pass, the reference beam again double passes quarter wave plate 317 so that upon being reflected a second time by the reference mirror back to interface 314, it is then reflected by interface 314 to form the reference beam component of output beam 380. Measurement beam 375, which is initially transmitted by interface 314, passes through quarter wave plate 319 and onto measurement mirror 318, which reflects it back through quarter wave plate 319 to interface 314. Because of the double pass through quarter wave plate 319, the measurement beam is then reflected by interface 314 to retroreflector 313, which laterally translates the beam and reflects it back to interface 314, which reflects it for a second pass to measurement mirror 318. During this second pass, the measurement beam again double passes quarter wave plate 319 so that upon being reflected a second time by the measurement mirror back to interface 314, it is then transmitted by interface 314 to form the measurement beam component of output beam 380. At this point, the reference and measurement beam components of output beam 380 retain the angular difference imparted by birefringent prim 320. Output beam 380 then enter a second birefringent prism 330 integrally attached to beam-splitting cube 312. Birefringent prism 330 has identical properties to those of prism 320 and compensates for the difference in propagation between the reference and measurement beam components to produce compensated output beam 390, in a manner similar to that shown in FIG. 2. Furthermore, if desired, the angular orientation of one or both of the reference and measurement mirrors 316 and 318 can be adjusted to optimized the overlap of the reference and measurement beam components of the compensated output beam, so that together with angular compensation by prism 330, the reference and measurement beam components of the compensated output beam can be made collinear. The direction of the measurement beam is aligned perpendicular to the nominal angular position of the measurement mirror so that during a subsequent translation of the measurement mirror, there will be no lateral shear of the output measurement beam introduced.

As in the embodiment of FIGS. 1 and 2, imperfections in interferometer system 300 may cause output beam 380 to include spurious beams in addition to the reference and measurement beam components of the output beam described in the previous paragraph (hereinafter referred to as the desired reference and measurement beam components). For example, birefringence in beam-splitting cube 312 can cause a spurious portion of the reference beam component in input beam 370 to propagate along some or all of the measurement path as part of measurement beam 375 and a spurious portion of the measurement beam component of input beam 370 to propagate along some or all of the reference path as part of reference beam 372. These spurious portions emerge as spurious reference and measurement beam components (dotted lines) in the output beam. However, as in the embodiment shown in FIG. 2, such spurious beams will have an angular difference imparted by prism 320 that is not compensated by prism 330 because they do not have correct polarizations when intersecting prism 330, and thus the spurious beams in the output beam diverge from the desired beam components and from each other.

Interferometry system 300 further includes a polarizer 395 positioned to mix the orthogonal polarizations of the desired portions of compensated output beam 390 to produce signal beam 392, whose time-varying intensity is monitored by photo-detector 396. The intensity signal includes a heterodyne interference signal at the frequency shift between the reference and measurement beam components of input beam 370. The interference signal is indicative of changes in the optical path length difference between the reference and measurement paths, e.g., changes in the relative position of measurement mirror 318. Although the spurious beam components may also propagate through polarizer 395 and onto photo-detector 396, any optical interference signal produced by them averages away when integrated over the spatial extent of the detector because they diverge from the compensated output beam and from each other. In additional embodiments, the output beam may be coupled to the detector through an optical fiber (e.g., a fiber-optic pick-up).

Generally, the angular difference introduced by the polarization optic permits the compensating optic(s) to discriminate against spurious beams resulting from imperfections located in the interferometry system following the introduction of the angular difference. In the embodiment of FIGS. 1 and 2 and in the embodiment of FIG. 3, the introduction of the angular difference occurs prior to beam propagation in the interferometer and the compensation of the angular difference occurs after propagation in the interferometer. In particular, in these embodiments the compensation optic (birefringent prisms 120 and 330, respectively) is also polarization optic in that it directs orthogonally polarized components differently. In additional embodiments, the compensation of the angular difference may occur within one or both of the reference and measurement paths of the interferometer. In such cases, a polarization optic may not be necessary as the compensation optic, because the interferometer itself separates the desired portions of the reference and measurement beams. One such embodiment is shown in FIG. 4.

Figure 4:
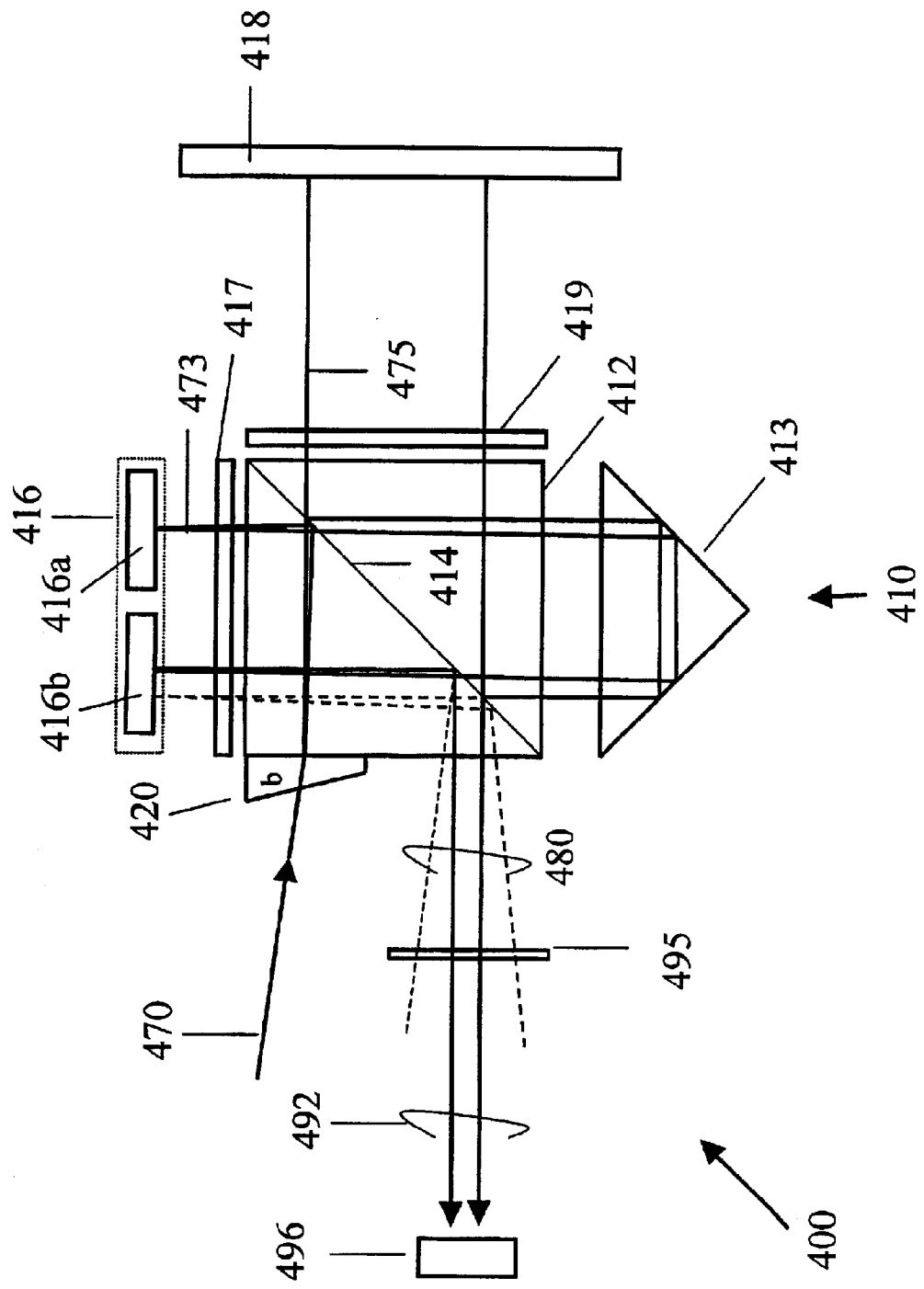
FIG. 4 is a schematic diagram of another embodiment of an interferometry system 400 that suppresses non-linearities caused by properties of the system. The interferometer 410 in this embodiment is a high-stability plane mirror interferometer (HSPMI). The polarization optic is a birefringent prism 420 positioned to receive the input beam. The compensating optic is a split portion 416b of a reference mirror 416. The split portion compensates for the angular difference imparted by prism 420 when the reference beam makes one of its passes to the reference mirror.

Referring to FIG. 4, an interferometry system 400 that suppresses non-linearities such as those caused by beam mixing includes a high-stability plane mirror interferometer (HSPMI) 410 having a polarizing beam-splitting cube 412, a split reference mirror 416 including a first portion 416a and a second portion 416b, a reference quarter wave plate 417, a measurement mirror 418, a measurement quarter wave plate 419, and a corner-cube retroreflector 413. Beam splitting cube 412 includes a polarizing beam splitting intreface 414. Measurement mirror 418 is typically connected to a measurement stage (not shown) that moves relative to the beam splitting cube.

During operation, interferometer 410 receives an input beam 470 having orthogonally polarized components defining reference and measurement beam components. The reference beam component is linearly polarized out of the plane of the figure, and the measurement beam component is linearly polarized in the plane of the figure. The orthogonally polarized components further include a heterodyne frequency shift between them. Prior to entering interferometer 410, input beam 470 intersects birefringent prism 420, e.g., a uniaxial crystal such as quartz. The optical axis of prism 420 is oriented such that the reference and measurement beam components of input beam 470 emerge with a small difference in their directions of propagation. In other words, prism 420 is identical to birefringent prism 320 in the embodiment of FIG. 3.

Following prism 420 and absent any imperfections in the interferometer, the reference and measurement beam components are spatially separated to define reference beam 473 and measurement beam 475, respectively, and directed along respective reference and measurement paths by polarizing beam-splitter interface 414. Reference beam 473, which is initially reflected by interface 414, passes through quarter wave plate 417 and onto reference mirror 416 (particularly portion 416a of the split reference mirror), which reflects it back through quarter wave plate 417 to interface 414. Because of the double pass through quarter wave plate 417, the reference beam is then transmitted through interface 414 to retroreflector 413, which laterally translates the beam and reflects it back through interface 414 for a second pass to reference mirror 416 (particularly portion 416b of the split reference mirror). During this second pass, the reference beam again double passes quarter wave plate 417 so that upon being reflected a second time by the reference mirror back to interface 414, it is then reflected by interface 414 to form the reference beam component of output beam 480. Measurement beam 475, which is initially transmitted by interface 414, passes through quarter wave plate 419 and onto measurement mirror 418, which reflects it back through quarter wave plate 419 to interface 414. Because of the double pass through quarter wave plate 419, the measurement beam is then reflected by interface 414 to retroreflector 413, which laterally translates the beam and reflects it back to interface 414, which reflects it for a second pass to measurement mirror 418. During this second pass, the measurement beam again double passes quarter wave plate 419 so that upon being reflected a second time by the measurement mirror back to interface 414, it is then transmitted by interface 414 to form the measurement beam component of output beam 480.

The angular difference introduced by prism 420 is compensated by split reference mirror 416. Unlike a conventional HSPMI that includes a single, flat reference mirror, reference mirror 416 includes two portions, 416a and 416b, that are oriented differently from one another. For example, in FIG. 4 portion 416a is aligned with the measurement beam path, whereas portion 416b is aligned at a small angle to the measurement beam path. The difference in angular orientation between portions 416a and 416b are selected to compensate for the angular difference introduced by birefringent prism 420, and thereby cause the reference and measurement beam components of output beam 480 to propagate parallel to one another. Furthermore, the angular orientation of split reference mirror 416 as a whole (i.e., the orientation of both portions 416a and 416b) may be adjusted to optimize the overlap of the reference and measurement components of output beam 480, e.g., to make them collinear. Alternatively, or in combination, such overlap may be optimized by adjusting the angular orientation of the measurement mirror. The direction of the measurement beam is aligned perpendicular to the nominal angular position of the measurement mirror so that during a subsequent translation of the measurement mirror, there will be no lateral shear of the output measurement beam introduced.

As in the embodiment of FIGS. 1 and 2 and the embodiment of FIG. 3, imperfections in interferometer system 400 may cause output beam 480 to include spurious beams in addition to the reference and measurement beam components of the output beam described in the previous paragraph (hereinafter referred to as the desired reference and measurement beam components). For example, birefringence in beam-splitting cube 412 can cause a spurious portion of the reference beam component in input beam 470 to propagate along some or all of the measurement path as part of measurement beam 475 and a spurious portion of the measurement beam component of input beam 470 to propagate along some or all of the reference path as part of reference beam 472. These spurious portions emerge as spurious reference and measurement beam components (dotted lines) in output beam 480. However, such spurious beams will either have an angular difference imparted by prism 420 that is not compensated by split reference mirror portion 416b or an angular difference imparted by split reference mirror portion 416b without any precompensation by birefringent prism 420, and thus the spurious beams in output beam 480 diverge from the desired beam components and from each other.

A polarizer 495 is positioned to mix the orthogonal polarizations of the desired portions of output beam 480 to produce signal beam 492, whose time-varying intensity is monitored by photo-detector 496. The intensity signal includes a heterodyne interference signal at the frequency shift between the reference and measurement beam components of input beam 470. The interference signal is indicative of changes in the optical path length difference between the reference and measurement paths, e.g., changes in the relative position of measurement mirror 418. Although the spurious beam components may also propagate through polarizer 495 and onto photo-detector 496, any optical interference signal produced by them averages away when integrated over the spatial extent of the detector because they diverge from the compensated output beam and from each other. In additional embodiments, the output beam may be coupled to the detector through an optical fiber (e.g., a fiber-optic pick-up).

In other embodiments, split reference mirror 416 can be replaced with a conventional plane mirror and the angle compensation can be achieved by introducing one or more optics within one or both of the measurement and reference paths. For example, with respect to the embodiment of FIG. 4, the angular compensation provided by portion 416b of split-reference mirror may be achieved by positioning a wedge (e.g., a non-bireflingent wedge) in the second pass to the reference mirror. Similarly, in the embodiment of FIGS. 1 and 2, birefringent prism 120 may be replaced by a smaller prism, like prism 320, which only contacts the input beam, and the angular compensation can be achieved by positioning a wedge (e.g., a non-birefringent wedge) in the reference beam path where reference retroreflector 116 directs the reference beam back to beam-splitting interface 114.

As such permutations demonstrate, it will be appreciated that various combinations of one or more optics in one or both of the reference, measurement, and output beam path can be used to compensate for the initial angular difference in propagation imparted to the orthogonally polarized components of the input beam such that the desired portions of the reference and measurement beam components are made co-parallel at the detector.

In further embodiments, the interferometry system may be a dynamic interferometry system, which include a dynamically adjustable element to redirect one or more of the reference beam, the measurement beam, the input beam and the output beam to maintain the reference and measurement beam components of the output beam co-parallel in response to changes in the angular orientation and/or position of the measurement object. Such dynamic interferometry systems are described in, for example, U.S. Pat. No. 6,252,667 to Henry A. Hill et al. entitled "Interferometer having a dynamic beam steering assembly" and issued Jun. 26, 2001 and U.S. patent application Ser. No. 09/384,851 to Henry A. Hill entitled "Interferometry system having a dynamic beam steering assembly for measuring angle and distance" and filed Aug. 27, 1999, the contents of which are incorporated herein by reference. In such embodiments, a polarization optic is again used to impart a small angular difference in the propagation directions of the reference and measurement beam components of the input beam. The compensation of this angular difference in the output beam is provided automatically by the dynamic element. In this sense, the dynamic element corresponds to the compensation optic of the present invention.

Figure 5:
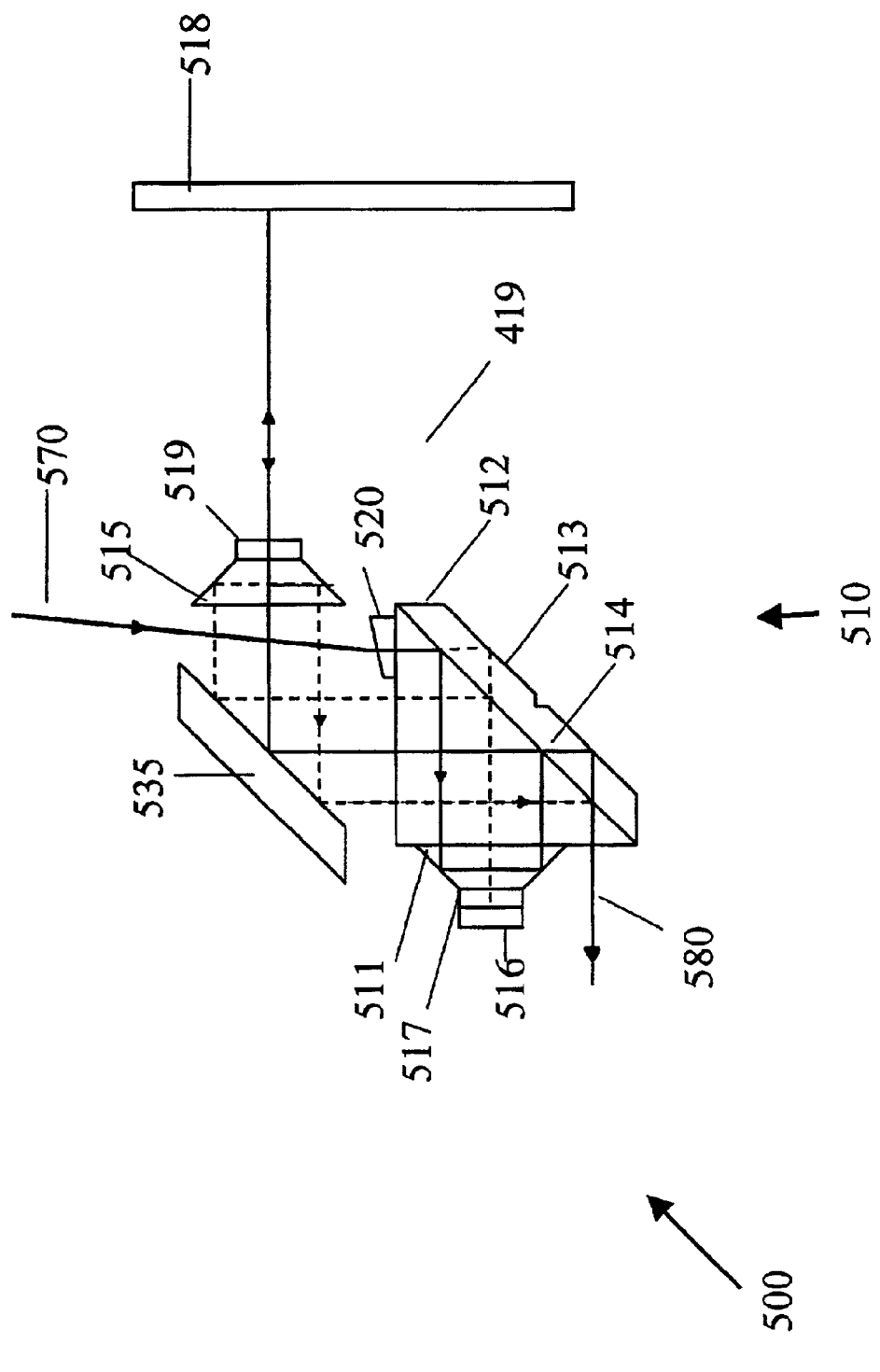
FIG. 5 is a schematic diagram of another embodiment of an interferometry system 500 that suppresses non-linearities caused by properties of the system. Like earlier embodiments, interferometer 510 in this embodiment includes a birefringent prism 520 as the polarization optic, which is positioned to receive the input beam. The compensating optic, however is formed by a dynamic mirror element 532, which also compensates for angular changes in the orientation of the measurement stage mirror 540.

Referring to FIG. 5, an interferometry system 500 that suppresses non-linearities such as those caused by beam mixing includes a single-pass, dynamic interferometer 510 having a polarizing beam-splitter 512, a reference mirror 516, a reference quarter wave plate 517, a measurement mirror 518, a measurement quarter wave plate 519, a reference retroreflector 515, a measurement retroreflector 511, and a dynamically orientable mirror 535. Beam-splitter cube 512 includes a polarizing beam splitting interface 514 and a back-reflective interface 513. Measurement mirror 518 is typically connected to a measurement stage (not shown) that moves relative to the rest of the interferometer. Dynamically orientable mirror 535 is coupled to a servo control system (not shown) that monitors the properties of the output beam and adjusts the orientation of mirror 535 in response.

During operation, interferometer 510 receives an input beam 570 having orthogonally polarized components defining reference and measurement beam components. The measurement beam component is linearly polarized out of the plane of the figure, and the reference beam component is linearly polarized in the plane of the figure. The orthogonally polarized components further include a heterodyne frequency shift between them. Prior to entering interferometer 510, input beam 570 intersects birefringent prism 520, e.g., a uniaxial crystal such as quartz. The optical axis of prism 520 is oriented such that the reference and measurement beam components of input beam 570 emerge with a small difference in their directions of propagation.

Following prism 520 and absent any imperfections in the interferometer, the reference and measurement beam components are spatially separated to define a reference beam (dotted line) and a measurement beam 575, respectively, and directed along respective reference and measurement paths by polarizing beam-splitter interface 514. The reference beam, which is initially transmitted through polarizing interface 514, is reflected by interface 513 towards an aperture in measurement retroreflector 511, through quarter wave plate 517 and onto reference mirror 516, which reflects it back through quarter wave plate 517 to interface 514. Because of the double pass through quarter wave plate 517, the reference beam is then reflected by interface 514 to dynamic mirror 535, which directs it to reference retroreflector 515, which in turn laterally translates the beam and reflects it back to dynamic mirror 535. Thereafter, dynamic mirror 535 directs the reference beam back to polarizing interface 514, which reflects it as the reference beam component of output beam 580. The measurement beam is reflected by polarizing interface 514 to measurement retroreflector 511, which laterally translates the beam and reflects it back to polarizing interface 514, which in turn reflects the beam to dynamic mirror 535. Then, dynamic mirror 535 directs the beam towards an aperture in reference retroreflector 515, through quarter wave plate 519 and onto measurement mirror 518, which reflects it back through quarter wave plate 519 to dynamic mirror 535, which in turn reflects it to polarizing interface 514. Because of the double pass through quarter wave plate 519, the measurement beam is transmitted by polarizing interface 514 and then reflected by interface 513 back through polarizing interface 514 to form the measurement beam component of output beam 580.

The orientation of dynamic mirror 535 can be adjusted to compensate for the angular difference imparted by prism 520 to make the reference and measurement beam components of output beam 580 co-parallel. Furthermore, the orientation of dynamic mirror 535 can be adjusted to make the reference and measurement beam components of output beam 580 co-parallel in response to changes in the angular orientation of measurement mirror 518. Such changes may result when the measurement mirror is connected to a translation stage that is scanned during operation. For a nominal orientation of the measurement mirror, any combination of the angular orientation of reference mirror 516, the angular orientation reflective interface 513, and the lateral positions of retroreflectors 511 and 515 may be set, if desired, to optimize the overlap of the reference and measurement beam components of output beam 580

As in the previously described embodiments, the angular difference in propagation imparted to the reference and measurement beam components of the input beam and the compensation by dynamic mirror 535 cause at least some of the spurious beams produced by imperfections in the interferometer to emerge in the output beam as components that diverge from each other and from the desired reference and measurement beam components. As a result, any optical interference signal produced by such spurious beams averages away when integrated over the spatial extent of a detector.

In the previously described embodiments, the polarization optic is attached integrally with the interferometer. In other embodiments, the polarization optic that produces the angular difference in the propagation directions of the reference and measurement beam components of the input beam may be spaced from the interferometer. For example, it be included as part of the source of the input beam, as is described below.

As mentioned above, the interferometry systems described herein typically employ an input beam having orthogonally polarized components with a heterodyne frequency shift between them. A light source for such an input beam typically includes a laser and may be any of a variety of frequency modulation apparatus and/or lasers. For example, the laser can be a gas laser, e.g., a HeNe laser, stabilized in any of a variety of conventional techniques known to those skilled in the art, see for example, T. Baer et al., "Frequency Stabilization of a 0.633 $\mu$m He-Ne-longitudinal Zeeman Laser," *Applied Optics,* 19, 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, the laser can be a diode laser frequency stabilized in one of a variety of conventional techniques known to those skilled in the art, see for example, T. Okoshi and K. Kikuchi, "Frequency Stabilization of Semiconductor Lasers for Heterodyne-type Optical Communication Systems," *Electronic Letters,* 16, 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics, QE*-19, 1514–1519 (1983).

The heterodyne frequency shift may be produced by any of the following techniques: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, 34, 225–232 (August 1968); Bagley et al., U.S. Pat. No. 3,656,853, issued Apr. 18, 1972; and H. Matsumoto, "Recent interferometric measurements using stabilized lasers," *Precision Engineering,* 6(2), 87–94 (1984); (2) use of a pair of acousto-optical Bragg cells, see for example, Y. Ohtsuka and K. Itoh, "Two-frequency Laser Interferometer for Small Displacement Measurements in a Low Frequency Range," *Applied Optics,* 18(2), 219–224 (1979); N. Massie et al., "Measuring Laser Flow Fields With a 64-Channel Heterodyne Interferometer," *Applied Optics,* 22(14), 2141–2151 (1983); Y. Ohtsuka and M. Tsubokawa, "Dynamic Two-frequency Interferometry for Small Displacement Measurements," *Optics and Laser Technology,* 16, 25–29 (1984); H. Matsumoto, ibid.; P. Dirksen, et al., U.S. Pat. No. 5,485,272, issued Jan. 16, 1996; N. A. Riza and M. M. K. Howlader, "Acousto-optic system for the generation and control of tunable low-frequency signals," *Opt. Eng.,* 35(4), 920–925 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., ibid.; (4) use of two longitudinal modes of a randomly polarized HeNe laser, see for example, J. B. Ferguson and R. H. Morris, "Single Mode Collapse in 6328 Å HeNe Lasers," *Applied Optics,* 17(18), 2924–2929 (1978); (5) use of birefringent elements or the like internal to the laser, see for example, V. Evtuhov and A. E. Siegman, "A "Twisted-Mode" Technique for Obtaining Axially Uniform Energy Density in a Laser Cavity," *Applied Optics,* 4(1), 142–143 (1965); or the use of the systems described in U.S. Pat. No. 6,236,507 B1 entitled "Apparatus to Transform Two Non-parallel Propagating Optical Beam Components into Two Orthogonally Polarized Beam Components," issued May 22, 2001 to Henry A. Hill and Peter de Groot, and U.S. Pat. No. 6,157,660 entitled "Apparatus for Generating Linearly-Orthogonally Polarized Light Beams," issued Dec. 5, 2000 to Henry A. Hill, the contents of both patents which are incorporated herein by reference.

Figure 6:
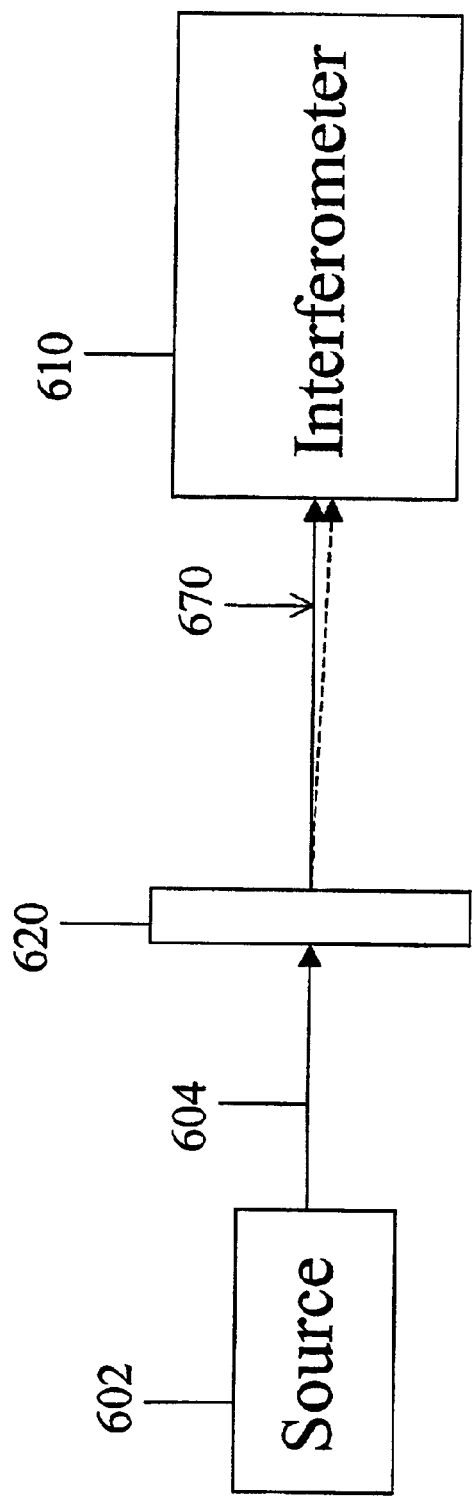
FIG. 6 is a schematic diagram of an embodiment in which the polarization optic is positioned adjacent a laser source.

Referring to FIG. 6, any of the interferometry systems described previously may include a laser source 602 (e.g., a Zeeman-split Helium Neon laser) for producing a beam 604 having the heterodyne frequency shift between orthogonal polarizations. Beam 604 is then incident on a polarization optic 620, which introduces a small angular difference in propagation between the orthogonally polarized components to produce input beam 670 to interferometer 610. The polarization optic may be any of the ones described above. The compensation of the angular difference takes place in or after interferometer 610 as described in the previous embodiments. Notably, polarization optic 620 is spaced from interferometer 610. Polarization optic 620 may also be integrally attached to source 602.

Figure 7:
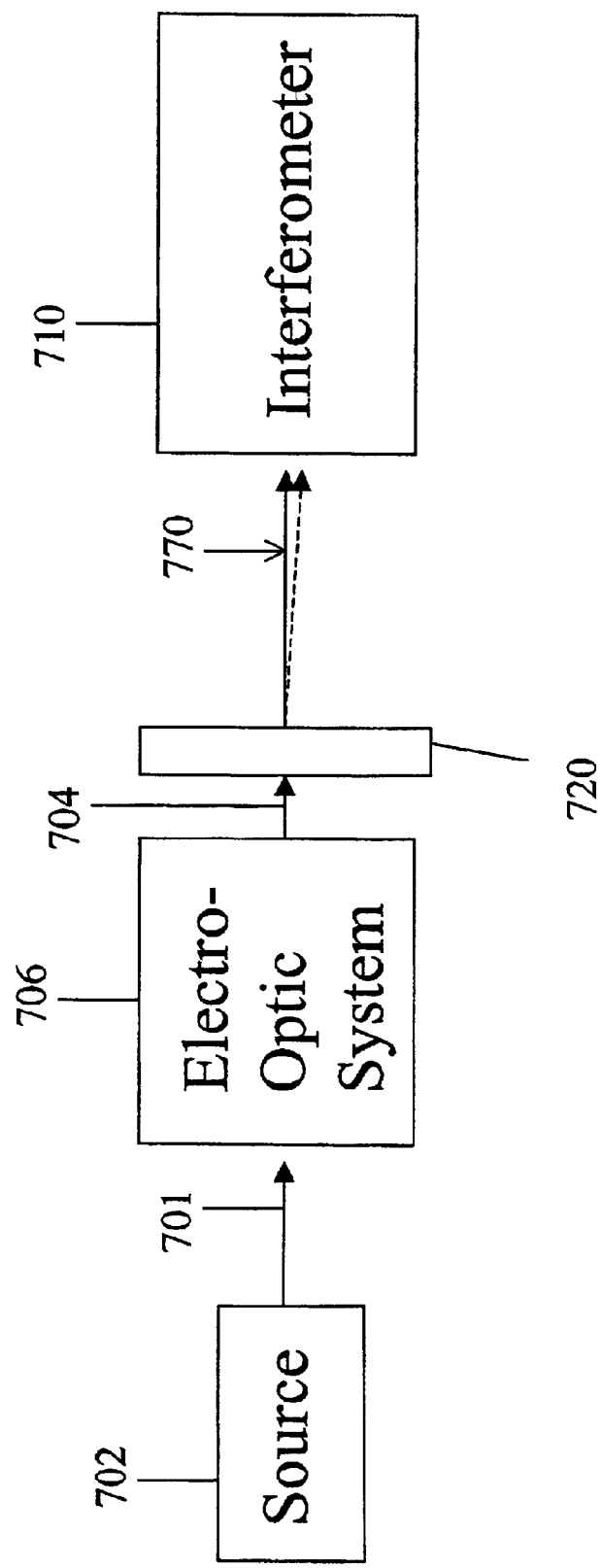
FIG. 7 is a schematic diagram of an embodiment in which the polarization optic is positioned adjacent an electro-optic modulator system for generating the heterodyne frequency split.

In another embodiment, shown in FIG. 7, a laser source 702 produces a beam 701, which is then sent to an electro-optic modulator system 706 to produce a beam 704 having the heterodyne frequency shift between orthogonal polarizations. The electro-optic modulator system may include one or more acousto-optical Bragg cells such as described above. Beam 704 is then incident on a polarization optic 720, which introduces a small angular difference in propagation between the orthogonally polarized components to produce input beam 770 to interferometer 710. The compensation of the angular difference takes place in or after interferometer 710 as described in the previous embodiments. Again, polarization optic 720 is spaced from interferometer 710. It may also be integrally attached to electro-optic system 706.

Figure 8:
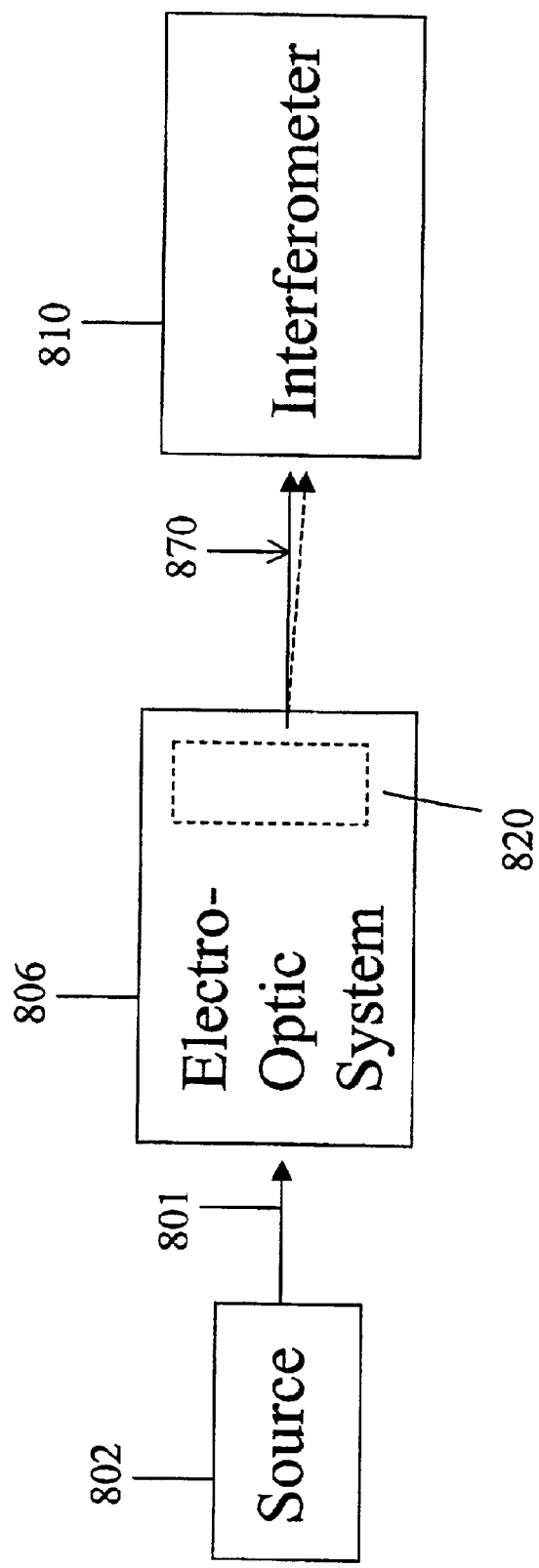
FIG. 8 is a schematic diagram of an embodiment in which the polarization optic is part of an electro-optic modulator system for generating the heterodyne frequency split.

In another embodiment, shown in FIG. 8, a laser source 802 produces a beam 801, which is then sent to an electro-optic modulator system 806 to produce a input beam 870 having the heterodyne frequency shift between orthogonal polarizations. Again, electro-optic modulator system 806 may include one or more acousto-optical Bragg cells such as described above. In this embodiment, however, the polarization optic 820 is included as part of electro-optic modulator system 806 to cause input beam 870 to have the small angular difference in propagation between its orthogonally polarized components. Again, the compensation of the angular difference takes place in or after interferometer 810 as described in the previous embodiments. Polarization optic 820 can be included as part of electro-optic modulator system 806 because such systems often include one or more birefringent optics. For example, in some of the electro-optic modulator systems described above, the acousto-optical Bragg cells are made from birefringent materials (see, e.g., U.S. Pat. Nos. 4,687,958 and 6,157,660 referred to above). The shape and construction of such cells can therefore be selected to produce a desired angular difference in propagation between the orthogonally polarized components having the heterodyne frequency shift. In such embodiments, the Bragg cell is the polarization optic. In another example, some of the electro-optic modulator systems described above include a birefringent prism to cause frequency-split, non-parallel propagating, orthogonally polarized components to be parallel propagating (see, for example, U.S. Pat. Nos. 4,684,828 and 6,236,507 B1 referred to above). In the present embodiments, such systems are modified so that rather than making the components parallel propagating, the birefringent prism is oriented and/or shaped to introduce a desired angular difference in propagation between the reference and measurement beam components of input beam 870. In addition, the birefringent prism and other birefringent and non-birefringent optic elements may be oriented and/or shaped to introduce a lateral shear between the reference and measurement beam components at the source so as to achieve a desired spatial relationship between the reference and measurement beam components of the output beam.

In additional embodiments of the invention, the interferometry system need not be a heterodyne interferometry system. Instead, for example, the principles and features disclosed herein (e.g., the use of the angular difference in the propagation directions of orthogonally polarized components of the input beam to suppress interference from spurious beam system) may be used in a homodyne system in which the reference and measurement beams have the same frequencies before the introduction of any Doppler shift.

The interferometry systems described above suppress interference from spurious beams arising from imperfections in the interferometer. As a result, such interferometry systems provide highly accurate measurements. Such systems can be especially useful in lithography applications used in fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap*, p82 (1997).

Overlay depends directly on the performance, i.e. accuracy and precision, of the distance measuring interferometers used to position the wafer and reticle (or mask) stages. Since a lithography tool may produce $50–100M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the resist that convert the radiation pattern into a latent image within the resist.

Interferometry systems are important components of the positioning mechanisms that control the position of the wafer and reticle, and register the reticle image on the wafer. If such interferometry systems include the features described above, the accuracy of distances measured by the systems increases as cyclic error contributions to the distance measurement are minimized.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes resist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithogaphy: Science and Technology* (Marcel Dekker, Inc., New York, 1998), the contents of which is incorporated herein by reference.

Interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, such interferometry systems can be used to measure the position of any one component of the exposure system relative to any other component of the exposure system, in which the interferometry system is attached to, or supported by, one of the components and the measurement object is attached, or is supported by the other of the components.

Figure 11A:
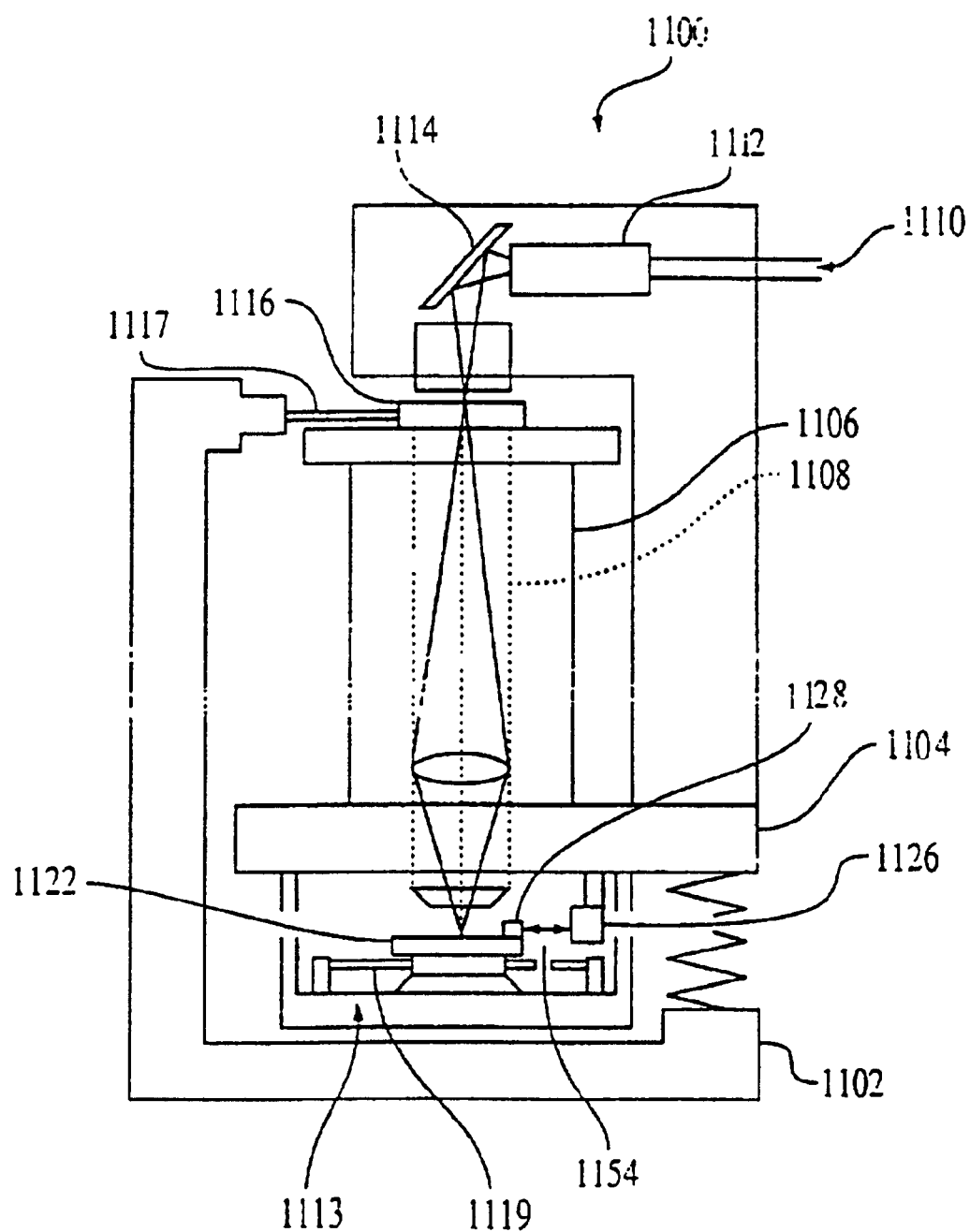
FIG. 11a is schematic diagram of a lithography system that includes an interferometry system described herein and is used to make integrated circuits.

An example of a lithography scanner 1100 using an interferometry system 1126 is shown in FIG. 11a. The interferometry system is used to precisely measure the position of a wafer (not shown) within an exposure system. Here, stage 1122 is used to position and support the wafer relative to an exposure station. Scanner 1100 includes a frame 1102, which carries other support structures and various components carried on those structures. An exposure base 1104 has mounted on top of it a lens housing 1106 atop of which is mounted a reticle or mask stage 1116, which is used to support a reticle or mask. A positioning system for positioning the mask relative to the exposure station is indicated schematically by element 1117. Positioning system 1117 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithgraphy: Science and Technology.*

Suspended below exposure base 1104 is a support base 1113 that carries wafer stage 1122. Stage 1122 includes a plane mirror 1128 for reflecting a measurement beam 1154 directed to the stage by interferometry system 1126. A positioning system for positioning stage 1122 relative to interferometry system 1126 is indicated schematically by element 1119. Positioning system 1119 can include, e.g., piezoelectric transducer elements and corresponding control electronics. The measurement beam reflects back to the interferometry system, which is mounted on exposure base 1104. The interferometry system can be any of the embodiments described previously.

During operation, a radiation beam 1110, e.g., an ultraviolet (UV) beam from a UV laser (not shown), passes through a beam shaping optics assembly 1112 and travels downward after reflecting from mirror 1114. Thereafter, the radiation beam passes through a mask (not shown) carried by mask stage 1116. The mask (not shown) is imaged onto a wafer (not shown) on wafer stage 1122 via a lens assembly 1108 carried in a lens housing 1106. Base 1104 and the various components supported by it are isolated from environmental vibrations by a damping system depicted by spring 1120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In some embodiments, the lithographic scanner can include what is known in the art as a column reference. In such embodiments, the interferometry system 1126 directs the reference beam (not shown) along an external reference path that contacts a reference mirror (not shown) mounted on some structure that directs the radiation beam, e.g., lens housing 1106. The reference mirror reflects the reference beam back to the interferometry system. The interference signal produce by interferometry system 1126 when combining measurement beam 1154 reflected from stage 1122 and the reference beam reflected from a reference mirror mounted on the lens housing 1106 indicates changes in the position of the stage relative to the radiation beam. Furthermore, in other embodiments the interferometry system 1126 can be positioned to measure changes in the position of reticle (or mask) stage 1116 or other movable components of the scanner system. Finally, the interferometry systems can be used in a similar fashion with lithography systems involving steppers, in addition to, or rather than, scanners.

Figure 11B:
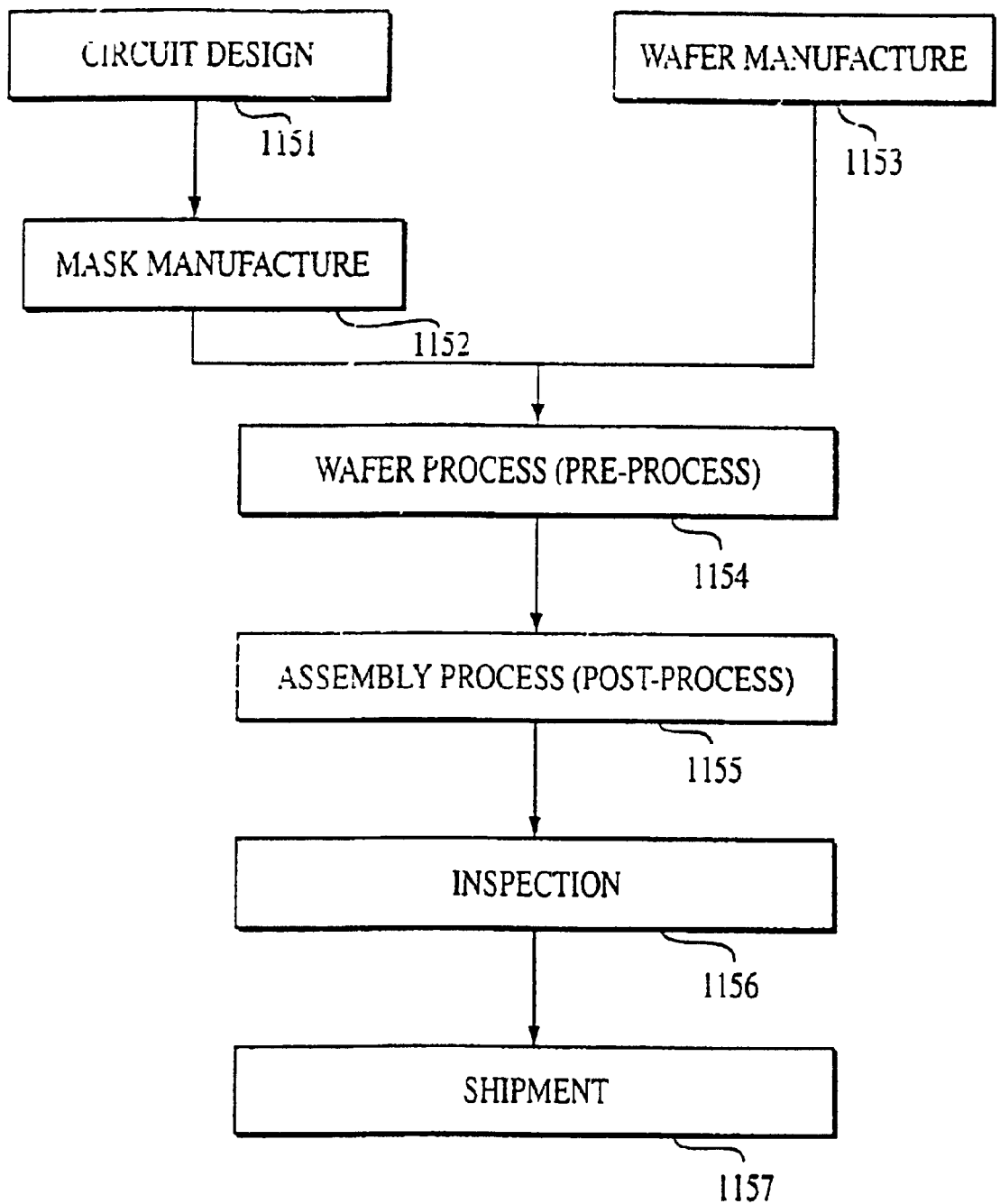
FIGS. 11b–c are flow charts that described steps for making integrated circuits.

As is well known in the art, lithography is a critical part of manufacturing methods for making semiconducting devices. For example, U.S. Pat. No. 5,483,343 outlines steps for such manufacturing methods. These steps are described below with reference to FIGS. 11*b* and 11*c*. FIG. 11*b* is a flow chart of the sequence of manufacturing a semiconductor device such as a semiconductor chip (e.g. IC or LSI), a liquid crystal panel or a CCD. Step 1151 is a design process for designing the circuit of a semiconductor device. Step 1152 is a process for manufacturing a mask on the basis of the circuit pattern design. Step 1153 is a process for manufacturing a wafer by using a material such as silicon.

Step 1154 is a wafer process which is called a pre-process wherein, by using the so prepared mask and wafer, circuits are formed on the wafer through lithography. To form circuits on the wafer that correspond with sufficient spatial resolution those patterns on the mask, interferometric positioning of the lithography tool relative the wafer is necessary. The interferometry methods and systems described herein can be especially useful to improve the effectiveness of the lithography used in the wafer process.

Step 1155 is an assembling step, which is called a post-process wherein the wafer processed by step 1154 is formed into semiconductor chips. This step includes assembling (dicing and bonding) and packaging (chip sealing). Step 1156 is an inspection step wherein operability check, durability check and so on of the semiconductor devices produced by step 1155 are carried out. With these processes, semiconductor devices are finished and they are shipped (step 1157).

Figure 11C:
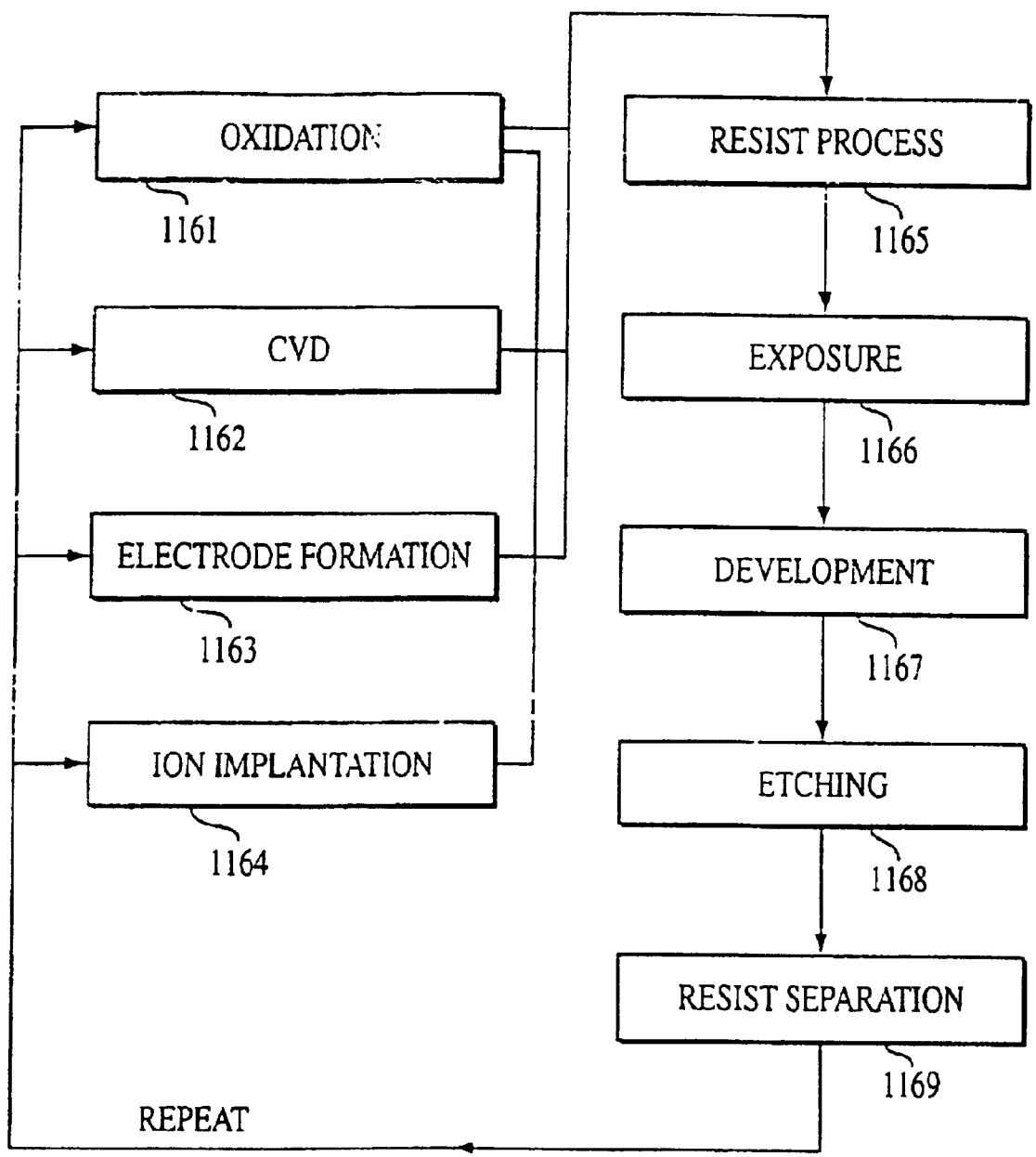

FIG. 11*c* is a flow chart showing details of the wafer process. Step 1161 is an oxidation process for oxidizing the surface of a wafer. Step 1162 is a CVD process for forming an insulating film on the wafer surface. Step 1163 is an electrode forming process for forming electrodes on the wafer by vapor deposition. Step 1164 is an ion implanting process for implanting ions to the wafer. Step 1165 is a resist process for applying a resist (photosensitive material) to the wafer. Step 1166 is an exposure process for printing, by exposure (i.e., lithography), the circuit pattern of the mask on the wafer through the exposure apparatus described above. Once again, as described above, the use of the interferometry systems and methods described herein improve the accuracy and resolution of such lithography steps.

Step 1167 is a developing process for developing the exposed wafer. Step 1168 is an etching process for removing portions other than the developed resist image. Step 1169 is a resist separation process for separating the resist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 12:
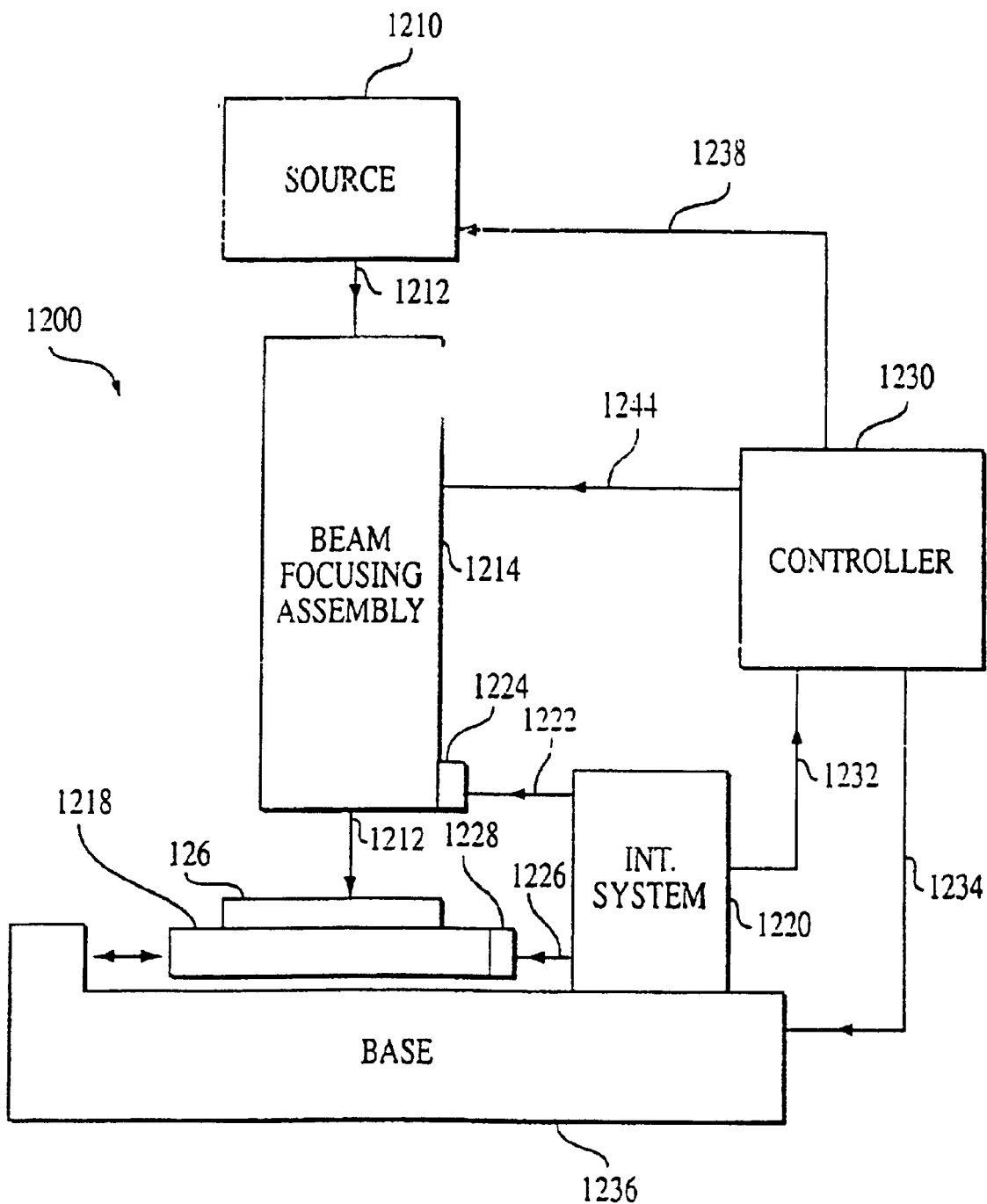
FIG. 12 is a schematic of a beam writing system that includes an interferometry system described herein.

As an example, a schematic of a beam writing system 1200 is shown in FIG. 12. A source 1210 generates a write beam 1212, and a beam focusing assembly 1214 directs the radiation beam to a substrate 1216 supported by a movable stage 1218. To determine the relative position of the stage, an interferometry system 1220 directs a reference beam 1222 to a mirror 1224 mounted on beam focusing assembly 1214 and a measurement beam 1226 to a mirror 1228 mounted on stage 1218. Since the reference beam contacts a mirror mounted on the beam focusing assembly, the beam writing system is an example of a system that uses a column reference. Interferometry system 1220 can be any of the interferometry systems described previously. Changes in the position measured by the interferometry system correspond to changes in the relative position of write beam 1212 on substrate 1216. Interferometry system 1220 sends a measurement signal 1232 to controller 1230 that is indicative of the relative position of write beam 1212 on substrate 1216. Controller 1230 sends an output signal 1234 to a base 1236 that supports and positions stage 1218. In addition, controller 1230 sends a signal 1238 to source 1210 to vary the intensity of, or block, write beam 1212 so that the write beam contacts the substrate with an intensity sufficient to cause photophysical or photochemical change only at selected positions of the substrate.

Furthermore, in some embodiments, controller 1230 can cause beam focusing assembly 1214 to scan the write beam over a region of the substrate, e.g., using signal 1244. As a result, controller 1230 directs the other components of the system to pattern the substrate. The patterning is typically based on an electronic design pattern stored in the controller. In some applications the write beam patterns a resist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics and for focusing and directing the radiation to the substrate.

A number of embodiments of the invention have been described. Nevertheless, it will be understood that various modifications may be made without departing from the spirit and scope of the invention. Accordingly, other embodiments are within the scope of the following claims.

What is claimed is:

1. An interferometry system comprising:

means for forming an input beam comprising orthogonally polarized components having an angular difference in propagation direction;

an interferometer positioned to receive the input beam, direct a reference beam derived from one of the orthogonally polarized components of the input beam along a reference path and direct a measurement beam derived from the other of the orthogonally polarized components of the input beam along a measurement path, and then recombine the reference and measurement beams to define an output beam; and at least one compensation optic positioned and oriented to cause the reference and measurement beam components of the output beam to be substantially co-parallel.

2. The system of claim 1, wherein the at least one compensation optic is positioned to receive the output beam from the interferometer and then cause the reference and measurement beam components of the output beam to be substantially co-parallel.

3. The system of claim 2, wherein the at least one compensation optic comprises a birefringent prism.

4. The system of claim 3, wherein the at least one compensation optic is the birefringent prism.

5. The system of claim 4, wherein the birefringent prism is integrally attached to the interferometer.

6. The system of claim 1, wherein the at least one compensation optic comprises a part of the interferometer.

7. The system of claim 6, wherein the at least one compensation optic comprises a mirror positioned along the reference path.

8. The system of claim 7, wherein the angular orientation of at least part of the mirror is selected to cause the reference and measurement beam components of the output beam to be substantially co-parallel.

9. The system of claim 8, wherein the mirror is a split reference mirror.

10. The system of claim 1, wherein the at least one compensation optic is positioned within the interferometer.

11. The system of claim 10, wherein the at least one compensation optic comprises a wedge prism.

12. The system of claim 11, wherein the wedge prism is non-birefringent.

13. The system of claim 11, wherein the wedge prism is positioned in the reference path.

14. The system of claim 1, wherein the means for forming the input beam comprises a polarization optic positioned to generate the angular difference in propagation direction between the orthogonally polarized components of the input beam.

15. The system of claim 14, wherein the polarization optic comprises a birefringent prism.

16. The system of claim 14, wherein the polarization optic is integrally attached to the interferometer.

17. The system of claim 14, wherein the means for forming the input beam further comprises a light source for the input beam and wherein the polarization optic is positioned between the light source and the interferometer.

18. The system of claim 17, wherein the source is a Zeeman-split laser.

19. The system of claim 14, wherein the means for forming the input beam further comprises an electro-optic system for producing a heterodyne frequency splitting between the orthogonally polarized components of the input beam, and wherein the polarization optic is adjacent the electro-optic system.

20. The system of claim 1, wherein the means for forming the input beam comprises an electro-optic system for producing a heterodyne frequency splitting between the orthogonally polarized components of the input beam and wherein the electro-optic system includes a birefringent element that generates the angular difference in propagation direction between the orthogonally polarized components.

21. The system of claim 1, wherein the interferometer is a Michelson interferometer.

22. The system of claim 1, wherein the interferometer is a plane mirror interferometer.

23. The system of claim 1, wherein the interferometer is a dynamic interferometer.

24. The system of claim 1, wherein the interferometer is a dispersion interferometer.

25. The system of claim 1, wherein the interferometer is a multi-axis interferometer.

26. The system of claim 1, further comprising a polarizer for mixing the polarization components of the output beam and a detector for measuring optical interference in the mixed output beam.

27. The system of claim 26, wherein the output beam is coupled to the detector through an optical fiber.

28. An interferometry method comprising:

directing an input beam comprising orthogonally polarized components having an angular difference in propagation direction into an interferometer;

directing a reference beam derived from at least a portion of one of the orthogonally polarized components along a reference path in the interferometer;

directing a measurement beam derived from at least a portion of the other of the orthogonally polarized components along a measurement path in the interferometer;

combining the reference and measurement beams in the interferometer to form an output beam propagating along an output path; and causing the reference and measurement beam components of the output beam to be substantially co-parallel.

29. The interferometry method of claim 28, wherein causing the reference and measurement beam components of the output beam to be substantially co-parallel comprises positioning a birefringent prism in the output path.

30. The interferometry method of claim 28, wherein causing the reference and measurement beam components of the output beam to be substantially co-parallel comprises defining at least one of the reference and measurement paths to cause the reference and measurement beam components of the output beam to be substantially co-parallel.

31. The interferometry method of claim 30, wherein causing the reference and measurement beam components of the output beam to be substantially co-parallel comprises defining the reference path to cause the reference and measurement beam components of the output beam to be substantially co-parallel.

32. The interferometry method of claim 31, wherein the reference path is defined to cause the reference and measurement beam components of the output beam to be substantially co-parallel by selecting the angular orientation of a mirror positioned along the reference path.

33. The interferometry method of claim 31, wherein the reference path is defined to cause the reference and measurement beam components of the output beam to be substantially co-parallel by positioning a wedge in the reference path.

34. The method of claim 28, wherein the orthogonally polarized components of the input beam overlap.

35. The method of claim 28, wherein the angular difference in propagation direction is between about 0.1 mrad and about 10 mrad.

36. The method of claim 35, wherein the angular difference in propagation direction is between about 0.5 mrad and about 10 mrad.

37. The method of claim 36, wherein the angular difference in propagation direction is between about 0.5 mrad and about 5 mrad.

38. A lithography system for use in fabricating integrated circuits on a wafer, the system comprising:
a stage for supporting the wafer;
an illumination system for imaging spatially patterned radiation onto the wafer;
a positioning system for adjusting the position of the stage relative to the imaged radiation; and
the interferometry system of claim 1 for measuring the position of the stage.

39. A lithography system for use in fabricating integrated circuits on a wafer, the system comprising:
a stage for supporting the wafer; and
an illumination system including a radiation source, a mask, a positioning system, a lens assembly, and the interferometry system of claim 1, wherein during operation the source directs radiation through the mask to produce spatially patterned radiation, the positioning system adjusts the position of the mask relative to the radiation from the source, the lens assembly images the spatially patterned radiation onto the wafer, and the interferometry system measures the position of the mask relative to the radiation from the source.

40. A lithography system for fabricating integrated circuits comprising first and second components, the first and second components being movable relative to each other, and the interferometry system of claim 1, wherein the first component comprises a measurement object positioned along the measurement path and the interferometry system measures the position of the first component relative to the second component.

41. A lithography system for fabricating integrated circuits comprising first and second components, the first and second components being movable relative to each other, and the interferometry system of claim 1, wherein the first component comprises a measurement object contacted by the measurement path and the second component is contacted by the reference path, and wherein the interferometry system measures the relative position of the first and second components.

42. A beam writing system for use in fabricating a lithography mask, the system comprising:
a source providing a write beam to pattern a substrate;
a stage supporting the substrate;
a beam directing assembly for delivering the write beam to the substrate;
a positioning system for positioning the stage and beam directing assembly relative one another; and
the interferometry system of claim 1 for measuring the position of the stage relative to the beam directing assembly.

43. A lithography method for use in fabricating integrated circuits on a wafer comprising:
supporting the wafer on a moveable stage;
imaging spatially patterned radiation onto the wafer;
adjusting the position of the stage; and
measuring the position of the stage using the interferometry method of claim 28.

44. A lithography method for use in the fabrication of integrated circuits comprising:
directing input radiation through a mask to produce spatially patterned radiation;
positioning the mask relative to the input radiation;
measuring the position of the mask relative to the input radiation using the interferometry method of claim 28, wherein one of a stage supporting the mask and a illumination system providing the input radiation include a measurement object contacted by the measurement path; and
imaging the spatially patterned radiation onto a wafer.

45. A lithography method for fabricating integrated circuits on a wafer comprising:
positioning a first component of a lithography system relative to a second component of a lithography system to expose the wafer to spatially patterned radiation; and
measuring the position of the first component relative to the second component using the method of claim 28 wherein the first component includes a measurement object contacted by the measurement path.

46. A beam writing method for use in fabricating a lithography mask, the method comprising:
directing a write beam to a substrate to pattern the substrate;
positioning the substrate relative to the write beam; and
measuring the position of the substrate relative to the write beam using the interferometry method of claim 28.

47. An interferometry system comprising:
a polarization optic positioned to generate an angular difference in propagation direction between orthogonally polarized components of an input beam;
an interferometer positioned to receive the input beam, direct a reference beam derived from one of the orthogonally polarized components of the input beam along a reference path and direct a measurement beam derived from the other of the orthogonally polarized components of the input beam along a measurement path, and then recombine the reference and measurement beams to define an output beam; and
at least one compensation optic positioned and oriented to cause the reference and measurement beam components of the output beam to be substantially co-parallel.

48. An interferometry system comprising:
an electro-optic system for producing a heterodyne frequency splitting between orthogonally polarized components of an input beam, the electro-optic system comprising a birefringent element positioned to generate an angular difference in propagation direction between the orthogonally polarized components of the input beam;
an interferometer positioned to receive the input beam, direct a reference beam derived from one of the orthogonally polarized components of the input beam along a reference path and direct a measurement beam derived from the other of the orthogonally polarized components of the input beam along a measurement path, and then recombine the reference and measurement beams to define an output beam; and
at least one compensation optic positioned and oriented to cause the reference and measurement beam components of the output beam to be substantially co-parallel.

* * * * *

UNITED STATES PATENT AND TRADEMARK OFFICE
CERTIFICATE OF CORRECTION

PATENT NO. : 6,778,280 B2
DATED : August 17, 2004
INVENTOR(S) : Peter De Groot and Henry A. Hill Page 1 of 1

It is certified that error appears in the above-identified patent and that said Letters Patent is hereby corrected as shown below:

<u>Title page,</u>
Item [56], References Cited, U.S. PATENT DOCUMENTS, replace "6,121,058" with -- 6,122,058 -- and replace "Shell et al." with -- Van Der Werf et al. --

<u>Column 26,</u>
Line 4, replace "a" with -- an --

Signed and Sealed this

Seventh Day of June, 2005

JON W. DUDAS
*Director of the United States Patent and Trademark Office*